(12) United States Patent
Choi et al.

(10) Patent No.: US 9,402,265 B1
(45) Date of Patent: *Jul. 26, 2016

(54) SYNCHRONIZED INTERFERENCE MITIGATION SCHEME FOR HETEROGENEOUS WIRELESS NETWORKS

(71) Applicant: MARVELL INTERNATIONAL LTD., Hamilton (BM)

(72) Inventors: Jihwan P. Choi, Daegu (KR); Yakun Sun, Sunnyvale, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,501

(22) Filed: Jun. 30, 2014

Related U.S. Application Data

(63) Continuation of application No. 13/307,471, filed on Nov. 30, 2011, now Pat. No. 8,767,616.

(60) Provisional application No. 61/472,569, filed on Apr. 6, 2011, provisional application No. 61/420,638, filed on Dec. 7, 2010.

(51) Int. Cl.
*H04W 72/12* (2009.01)
*H04L 5/00* (2006.01)
(Continued)

(52) U.S. Cl.
CPC ........ *H04W 72/1231* (2013.01); *H04J 11/0023* (2013.01); *H04J 11/0026* (2013.01); *H04J 13/00* (2013.01); *H04L 5/0073* (2013.01); *H04L 5/0085* (2013.01); *H04L 5/26* (2013.01)

(58) Field of Classification Search
CPC ....... H04L 5/0073; H04L 5/0085; H04L 5/26; H04J 11/0026; H04J 13/00; H04J 13/0023
See application file for complete search history.

(56) References Cited

U.S. PATENT DOCUMENTS 6,614,797 B1 * 9/2003 Hippelainen ....... H04L 12/6418
370/236
7,215,659 B1 * 5/2007 Chen ..................... H04W 16/14
370/338

(Continued)

OTHER PUBLICATIONS

Vucevic, N.; Perez-Romero, J.; Salient, O.; Agusti, R., "Joint radio resource management for LTE-UMTS coexistence scenarios," Personal, Indoor and Mobile Radio Communications, 2009 IEEE 20th International Symposium on, vol., no., pp. 12,16, Sep. 13-16, 2009, doi: 10.1109/PIMRC.2009.5450181.*

(Continued)

*Primary Examiner* — Andrew Lai
*Assistant Examiner* — Hoyet H Andrews

(57) ABSTRACT

In a method of synchronizing time domain multiplexing interference mitigation schemes of at least a first, second, and third wireless communication link within a first, second, and third network, respectively, a first set of parameters defining a first set of time intervals is determined. The first set of time intervals is utilized to schedule transmissions of the first wireless communication link to reduce interference with transmissions of the second wireless communication link. A second set of parameters defining a second set of time intervals is determined. The second set of time intervals is utilized to schedule transmissions of the first wireless communication link to reduce interference with transmissions of the third wireless communication link. The second set of parameters is determined based at least in part on at least one of the first set of parameters.

20 Claims, 11 Drawing Sheets

(51) Int. Cl.
*H04J 11/00* (2006.01)
*H04L 5/26* (2006.01)
*H04J 13/00* (2011.01)

(56) References Cited

U.S. PATENT DOCUMENTS

| | | | | |
|---|---|---|---|---|
| 7,277,692 B1* | 10/2007 | Jones | ............... | H04S 3/00 340/574 |
| 7,751,377 B2* | 7/2010 | Yang | ............... | H04W 72/02 370/216 |
| 8,094,597 B1* | 1/2012 | Chhabra | ............... | H04W 52/0235 370/311 |
| 8,270,374 B2* | 9/2012 | Cai | ............... | H04W 36/0055 370/252 |
| 8,767,616 B2* | 7/2014 | Choi | ............... | G01S 19/03 370/312 |
| 2002/0136233 A1* | 9/2002 | Chen | ............... | H04W 72/1215 370/445 |
| 2002/0181492 A1* | 12/2002 | Kasami | ............... | H04W 72/1257 370/445 |
| 2003/0093513 A1* | 5/2003 | Hicks | ............... | H04L 12/2697 709/224 |
| 2005/0059347 A1* | 3/2005 | Haartsen | ............... | H04W 16/14 455/41.2 |
| 2008/0279163 A1* | 11/2008 | Desai | ............... | H04W 52/267 370/338 |
| 2009/0285158 A1* | 11/2009 | Rezaiifar | ............... | H04W 52/343 370/328 |
| 2010/0238883 A1* | 9/2010 | Borran | ............... | H04W 16/10 370/329 |
| 2011/0268064 A1* | 11/2011 | Chen | ............... | H04L 5/003 370/329 |
| 2013/0114483 A1* | 5/2013 | Suzuki | ............... | H04W 76/048 370/311 |
| 2013/0176981 A1* | 7/2013 | Earnshaw | ............... | H04L 1/02 370/329 |

OTHER PUBLICATIONS

Hernández, A.; Guio, I.; Valdovinos, A., titled "Downlink scheduling for intercell interference fluctuation mitigation in partial-loaded broadband cellular OFDMA systems", presented at Ultra Modern Telecommunications & Workshops, 2009. ICUMT '09. International Conference on, vol., no., pp. 1,6, Oct. 12-14, 2009, doi: 10.1109/ICUMT.2009.5345505.*

Ghosh, A.; Ratasuk, R.; Mondal, B.; Mangalvedhe, N.; Thomas, T., (Ghosh et al.), titled "LTE-advanced: next-generation wireless broadband technology [Invited Paper]", (Ghosh hereinafter), presented in Wireless Communications, IEEE , vol. 17, No. 3, pp. 10,22, Jun. 2010, doi: 10.1109/MWC.2010.5490974.*

Vucevic, N.; Perez-Romero, J.; Sallent, O.; Agusti, R., "Joint radio resource management for LTE-UMTS coexistence scenarios," Personal, Indoor and Mobile Radio Communications, 2009 IEEE 20th International Symposium on , vol., no., pp. 12,16, Sep. 13-16, 2009, doi: 10.1109/PIMRC.2009.5450181.*

Hernández, A.; Guio, I.; Valdovinos, A., titled "Downlink scheduling for intercell interference fluctuation mitigation in partial-loaded broadband cellular OFDMA systems ", presented at Ultra Modern Telecommunications & Workshops, 2009. ICUMT '09. International Conference on, vol., no., pp. 1,6, Oct. 12-14, 2009, doi: 10.1109/ICUMT.2009.5345505.*

Kamel, M.I.; Elsayed, K.M.F., "Performance evaluation of a coordinated time-domain eICIC framework based on ABSF in heterogeneous LTE-Advanced networks," Global Communications Conference (GLOBECOM), 2012 IEEE, vol., no., pp. 5326,5331, Dec. 3-7, 2012, doi: 10.1109/GLOCOM.2012.6503967.*

Ghosh, A.; Ratasuk, R.; Mondal, B.; Mangalvedhe, N.; Thomas, T., (Ghosh et al.), titled "LTE-advanced: next-generation wireless broadband technology [Invited Paper]", presented in Wireless Communications, IEEE , vol. 17, No. 3, pp. 10, 22, Jun. 2010, doi: 10.1109/MWC.2010.5490974.*

Vucevic, N.; Perez-Romero, J.; Salient, O.; Agusti, R., "Joint radio resource management for LTE-UMTS coexistence scenarios," Personal, Indoor and Mobile Radio Communications, 2009 IEEE 20th International Symposium on , vol., No., pp. 12, 16, Sep. 13-16, 2009, doi: 10.1109/PIMRC.2009.5450181.*

Hernández, A.; Guio, I.; Valdovinos, A., titled "Downlink scheduling for intercell interference fluctuation mitigation in partial-loaded broadband cellular OFDMA systems ", presented at Ultra-Modern Telecommunications & Workshops, 2009, ICUMT '09. International Conference on, vol., No., pp. 1, 6, Oct. 12-14, 2009, doi: 10.1109/ICUMT.2009.5345505.*

Ghosh, A.; Ratasuk, R.; Mondal, B.; Mangalvedhe, N.; Thomas, T., "LTE-advanced: next-generation wireless broadband technology [Invited Paper]," Wireless Communications, IEEE , vol. 17, No. 3, pp. 10,22, doi: 10.1109/MWC.2010.5490974 (Jun. 2010).

Hernandez, A.; Guio, 1.; Valdovinos, A., titled "Downlink scheduling for intercell interference fluctuation mitigation in partial-loaded broadband cellular OFDMA systems", presented at Ultra Modern Telecommunications & Workshops, 2009. ICUMT '09. International Conference on, vol., no., pp. 1,6, 12-14, doi: 10.1109/ICUMT.2009.5345505 (Oct. 2009).

Kamel, M.I.; Elsayed, K.M.F., "Performance evaluation of a coordinated time-domain eICIC framework based on ABSF in heterogeneous LTE-Advanced networks," Global Communications Conference (GLOBECOM), 2012 IEEE, vol., no., pp. 5326,5331, (Dec. 3-7, 2012).

Vucevic, N.; Perez-Romero, J.; Salient, 0.; Agusti, R., "Joint radio resource management for LTE-UMTS coexistence scenarios," Personal, Indoor and Mobile Radio Communications, 2009 IEEE 20th International Symposium on, vol., no., pp. 12,16, 13-16, doi: 10.1109/PIMRC32009.5450181 (Sep. 2009).

IEEE Std P802.11-REVma/06.0, (Revision of IEEE Std 802.11-1999) "Unapproved Draft Standard for Information Technology-Telecommunications and information exchange between systems-Local and metropolitan area network-Specific requirements Part 11: Wireless LAN Medium Access Control (MAC) and Physical Layer (PHY) specifications,".

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007)/

IEEE Std. 802.11™ "IEEE Standard for Information Technology-Telecommunications and information exchange between systems—Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.,* pp. 1-535 (Oct. 2009).

IEEE Std 802.15.3c/D07 (Amendment to IEEE Std 802.15.3-2003) "Draft Amendment to IEEE Standard for Information technology—Telecommunications and information exchange between systems—Local and metropolitan area networks-Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.,* pp. 1-201 (2009).

IEEE Std 802.15.4™-2011 (Revision of IEEE Std 802.15.4-2006) "IEEE Standard for Local and metropolitan area networks-Part 15.4: Low-Rate Wireless Personal Area Networks (LR-WPANs)," *The Institute of Electrical and Electronics Engineers, Inc.* pp. 1-314 (Sep. 5, 2011).

Chen, "Home Network Basis: Transmission Environments and Wired/Wireless Protocols," *Prentice Hall,* pp. 1-26 (Jul. 2003).

Golmie et al., "Bluetooth and WLAN Coexistence: Challenges and Solutions," IEEE Wireless Comm., vol. 10, No. 6, pp. 22-29, (2003).

Harada, "Project: IEEE P802.15 Working Group for Wireless Personal Area Network (WPANs)," IEEE 802.15-07-0693-003c, slides 24-33 (May 2007).

(56) References Cited

OTHER PUBLICATIONS

Hiertz et al., "The IEEE 802.11 Universe," *IEEE Communications Magazine*, pp. 62-70, (Jan. 2010).
"How 802.11 b/g Wireless WLAN and Bluetooth Can Play; Without Standards-Based Solutions, ICs Must Referee Spectrum Rivalry," Philips Electronics, dated Sep. 2005, 5 pages.
Quinnell, Richard A., "WiFi and Bluetooth Fight for Bandwith," EDN, dated Aug. 4, 2005, 4 pages.
"Technical White Paper: Long Term Evolution (LTE): A Technical Overview", Motorola, 15 pages. (2007).
"WiFi™ and Bluetooth™—Interference Issues," HP, dated Jan. 2002, 6 pages.
Wojtiuk, "Bluetooth and WiFi Integration: Solving Co-Existence Challenges," RF Design, dated Oct. 2004, 4 pages.
"Wi-Fi Peer-to-Peer (P2P) Technical Specification, Version 1.00", Wi-Fi Alliance, pp. 1-135, Dec. 1, 2009.
Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 149 pages (Mar. 2010).
3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", 32 pages. (Dec. 2010).
3GPP TS 23.122 V9.5.0, "3rd Generation Partnership Project; Technical Specification Group Core Network and Terminals; Non-Access-Stratum (NAS) functions related to Mobile Station (MS) in idle mode (Release 9)", 42 pages (Dec. 2010).
3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", 297 pages. (Dec. 2010).

* cited by examiner

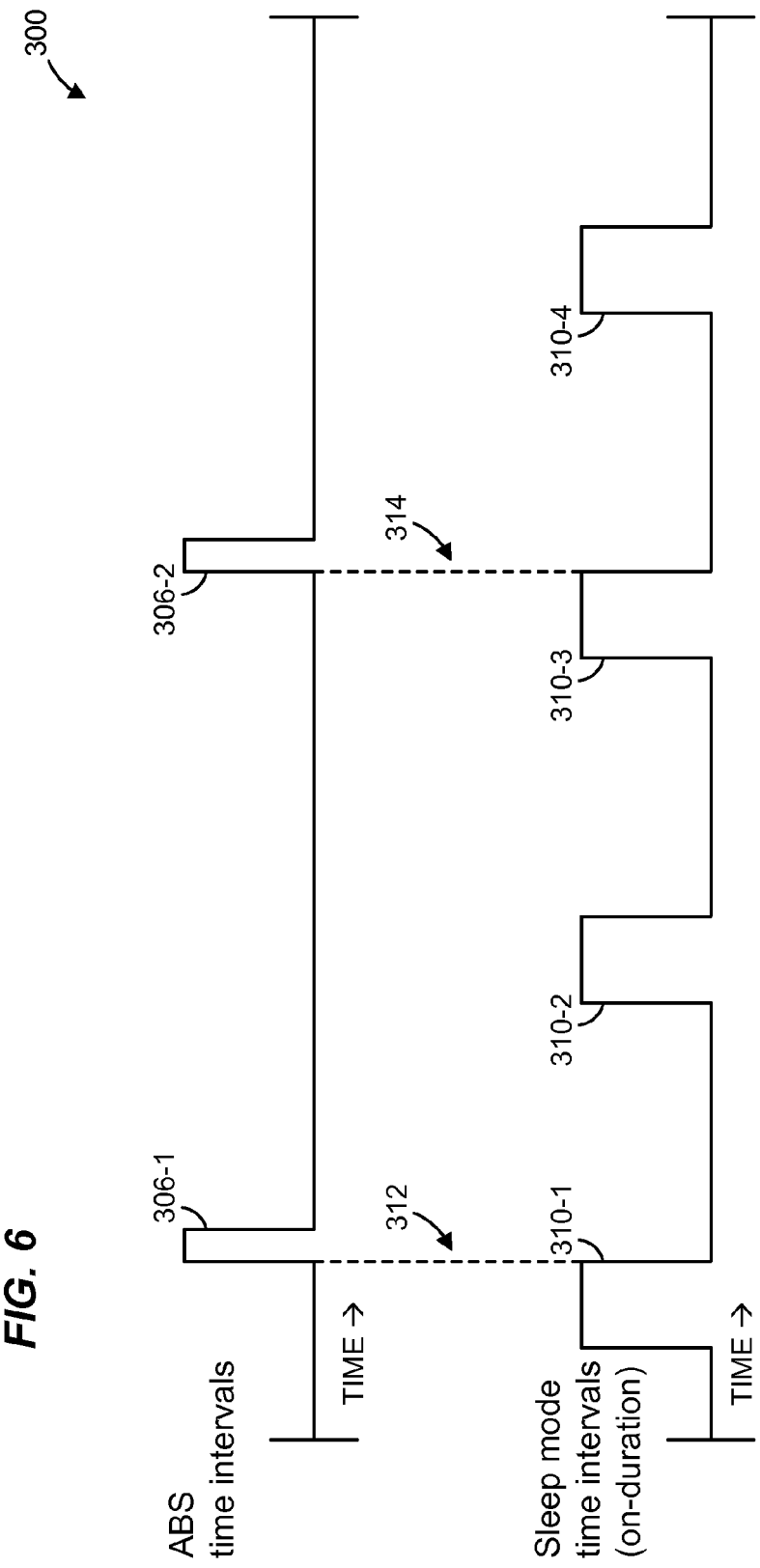

SYNCHRONIZED INTERFERENCE MITIGATION SCHEME FOR HETEROGENEOUS WIRELESS NETWORKS

CROSS-REFERENCES TO RELATED APPLICATION

This present application is a continuation of U.S. patent application Ser. No. 13/307,471, now U.S. Pat. No. 8,767, 616, entitled "A Synchronized Interference Mitigation Scheme for Heterogeneous Wireless Networks," and filed on Nov. 30, 2011, which claims the benefit of the following U.S. Provisional Patent Applications:

U.S. Provisional Patent Application No. 61/420,638, filed on Dec. 7, 2010; and

U.S. Provisional Patent Application No. 61/472,569, filed on Apr. 6, 2011.

All of the patent applications referenced above are hereby incorporated by reference herein in their entireties.

FIELD OF TECHNOLOGY

The present disclosure relates generally to wireless networks and, more particularly, to methods and systems for synchronizing interference mitigation schemes utilized by heterogeneous wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless communication networks such as cellular networks, wireless local area networks (WLAN), and wireless personal area networks (WPAN) have become increasingly common, causing different types of networks to more frequently coexist in a single heterogeneous network. For example, user devices (e.g., handsets) designed to operate within cellular networks are increasingly designed to also operate with other wireless networks, such as WiFi, Bluetooth, and global positioning system (GPS) networks. Moreover, some cellular networks are themselves heterogeneous networks that include two or more overlapping networks or network segments. For example, a heterogeneous wireless network arranged according to the 3$^{rd}$ Generation Partnership Project Long Term Evolution (3GPP LTE) Standard (currently under development) can include a macro cell as well as one or more pico and/or femto cells located within or partially within the area of the macro cell. As another example, a 3GPP LTE cellular network can include a donor cell (e.g., a macro cell) as well as a relay network located partially within the area of the donor cell, where the relay network relays data (e.g., broadcast data) from a base station in the donor cell to user devices that reside outside the area of the donor cell.

As a result of this increasing overlap of coexisting wireless networks, interference between networks and/or network segments has become a significant problem. Solutions designed to ameliorate this problem have included time domain multiplexing (TDM) interference mitigation schemes. Generally, TDM interference mitigation schemes reduce interference by scheduling when particular communication links within a heterogeneous wireless network may transmit data, or transmit certain kinds and/or amounts of data. These schemes have been successful in improving signal quality, but decrease the data throughput of the networks.

SUMMARY

In one embodiment, a method of synchronizing time domain multiplexing interference mitigation schemes of at least a first wireless communication link within a first network, a second wireless communication link within a second network, and a third wireless communication link within a third network includes determining a first set of one or more parameters defining a first set of time intervals. The first set of time intervals is utilized to schedule data transmissions of the first wireless communication link to reduce interference with data transmissions of the second wireless communication link. The method also includes determining a second set of one or more parameters defining a second set of time intervals. The second set of time intervals is utilized to schedule data transmissions of the first wireless communication link to reduce interference with data transmissions of the third wireless communication link. The second set of one or more parameters is determined based at least in part on at least one of the first set of one or more parameters.

In another embodiment, a wireless communication network device includes a network controller configured to determine a first set of one or more parameters defining a first set of time intervals. The first set of time intervals is utilized to schedule data transmissions of a first wireless communication link within a first network to reduce interference with data transmissions of a second wireless communication link within a second network. The network controller is also configured to determine a second set of parameters defining a second set of time intervals. The second set of time intervals is utilized to schedule data transmissions of the first wireless communication link to reduce interference with data transmissions of a third wireless communication link within a third network. The second set of parameters is determined based at least in part on at least one of the first set of one or more parameters.

In another embodiment, a method of synchronizing time domain multiplexing interference mitigation schemes of a heterogeneous cellular network and a coexisting wireless communication network, wherein the heterogeneous cellular network includes at least a first cell and a second cell, includes determining a first set of one or more parameters defining a first set of time intervals. The first set of time intervals is utilized to schedule data transmissions associated with the first cell to reduce interference with data transmissions associated with the second cell. The method also includes determining a second set of parameters defining a second set of time intervals. The second set of time intervals is utilized to schedule data transmissions associated with the first cell to reduce interference with data transmissions associated with the coexisting wireless communication network. At least a first parameter of the second set of parameters is determined based on a measured or expected activity level in the coexisting wireless communication network. At least a second parameter of the second set of parameters is determined based at least in part on at least one of the first set of one or more parameters.

In another embodiment, a wireless communication network device includes a network controller configured to determine a first set of one or more parameters defining a first set of time intervals. The first set of time intervals is utilized to schedule data transmissions associated with a first cell of a heterogeneous cellular network to reduce interference with data transmissions associated with a second cell of the heterogeneous cellular network. The network controller is also configured to determine a second set of parameters defining a second set of time intervals. The second set of time intervals is utilized to schedule data transmissions associated with the first cell to reduce interference with data transmissions associated with a wireless communication network that coexists with the heterogeneous cellular network. At least a first parameter of the second set of parameters is determined based on a measured or expected activity level in the wireless communication network. At least a second parameter of the second set of parameters is determined based at least in part on at least one of the first set of one or more parameters.

BRIEF DESCRIPTION OF THE DRAWINGS

FIG. 6 is a diagram illustrating example synchronized time intervals of two interference mitigation schemes, according to an embodiment.

DETAILED DESCRIPTION

In embodiments described below, a first scheme is utilized to mitigate interference between a first wireless communication link within a first network and a second wireless communication link within a second network, and a second scheme is utilized to mitigate interference between the first wireless communication link and a third wireless communication link within a third network. As used herein, a "network" may refer to an independent network, or to a network segment within a larger network (e.g., a macro cell, pico cell, or femto cell network within a heterogeneous cellular network, a relay network within a cellular network, etc.). Thus, for example, a macro cell and a pico cell may be referred to as separate networks, even if the macro cell and the pico cell are both segments of a single, heterogeneous cellular network (e.g., a $3^{rd}$ Generation Partnership Project Long Term Evolution (3GPP LTE) network, a $3^{rd}$ Generation Partnership Project Universal Mobile Telecommunications System (3GPP UMTS) network, etc.).

Generally, the interference mitigation schemes of the described embodiments utilize time domain multiplexing (TDM) to schedule time intervals during which no data transmissions are permitted on a particular wireless communication link, or, alternatively, only a particular amount and/or type of data may be transmitted (e.g., only transmissions at a particular data rate, only control signal transmissions, etc.). For instance, in an example TDM interference mitigation scheme, a set of time intervals (e.g., a portion of each data unit) corresponds to times during which only control signal transmissions are allowed on a first wireless communication link of a first network, but all data transmissions (e.g., including user-specific payload data) are allowed on a second wireless communication link of a second network. In this manner, interference with the second wireless communication link caused by the first wireless communication link may be reduced or eliminated.

In embodiments described below, time intervals of at least the first interference mitigation scheme and the second interference mitigation scheme are synchronized. By controlling the alignment (e.g., overlap, offset, etc.) of the time intervals of the various interference mitigation schemes, loss of data throughput due to the interference mitigation schemes may be reduced or even minimized.

Figure 1:
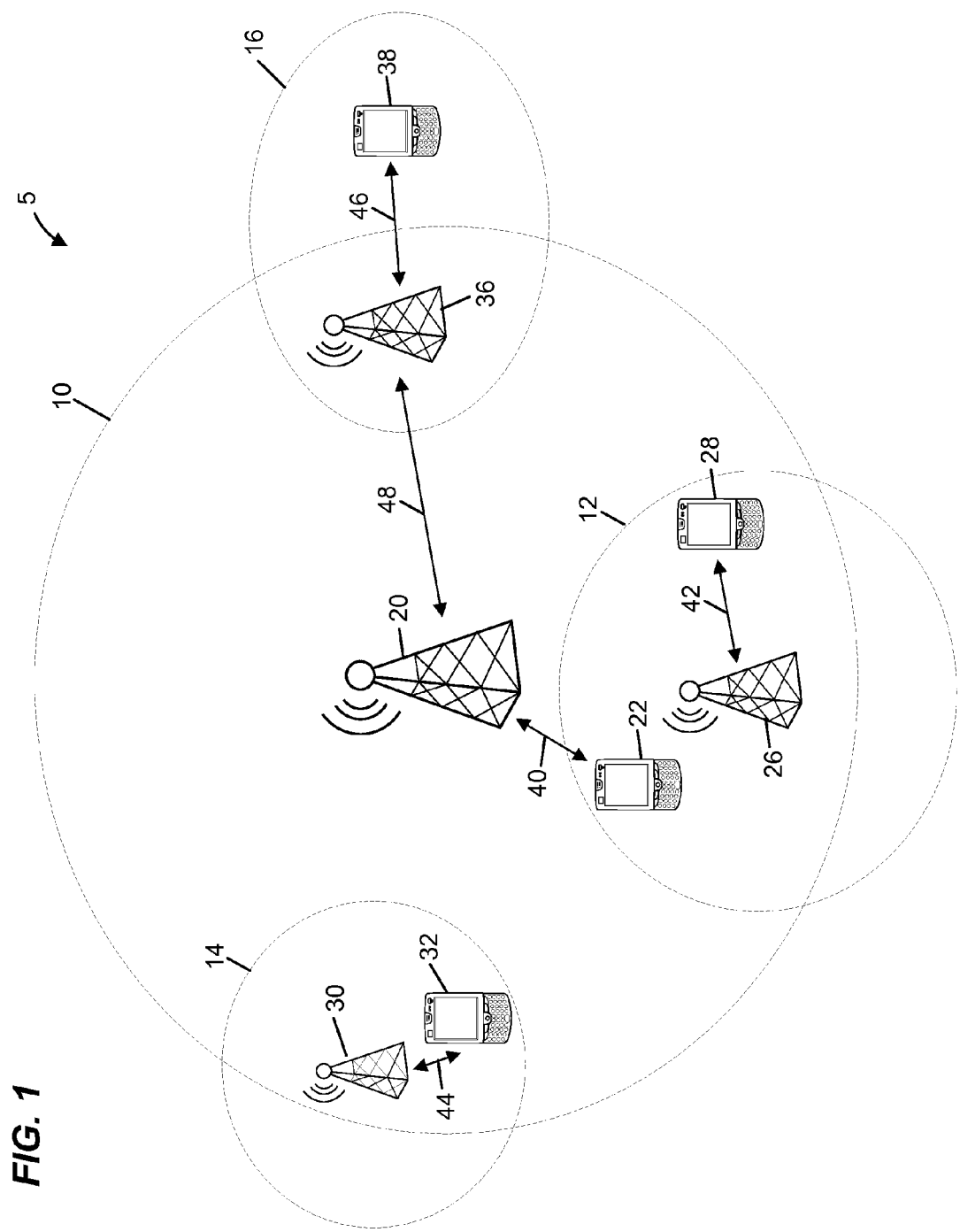
FIG. 1 is a block diagram of an example heterogeneous wireless network, according to an embodiment.

FIG. 1 is a block diagram of an example heterogeneous wireless network 5, according to an embodiment. The heterogeneous wireless network 5 illustrated in FIG. 1 includes a heterogeneous cellular network comprising multiple component networks, including a macro cell network 10, a pico cell network 12, a femto cell network 14, and a relay network 16. The macro cell network 10 includes a base station 20 and a user device 22, the pico cell network 12 includes a base station 26 and a user device 28, the femto cell network 14 includes a base station 30 and a user device 32, and the relay network 16 includes a relay base station 36 and a user device 38. In some embodiments and/or scenarios, the base station 20 also acts as a "donor" base station to the relay network 16 (i.e., relay network 16 relays data from base station 20 to the user device 38 via relay base station 36). In these embodiments, relay base station 36 is a part of both macro cell network 10 and relay network 16.

While the heterogeneous wireless network 5 illustrated in FIG. 1 includes one macro cell network 10, one pico cell network 12, one femto cell network 14, and one relay network 16, other embodiments include more than one macro, pico, and/or femto cell network, and/or more than one relay network. Moreover, some embodiments do not include the macro cell network 10, pico cell network 12, or femto cell network 14, and/or do not include the relay network 16. Furthermore, while the heterogeneous wireless network 5 illustrated in FIG. 1 shows only one user device associated with each cell network 10, 12, 14 and only one user device associated with the relay network 16, other embodiments and/or scenarios include multiple user devices per network. While the heterogeneous wireless network 5 illustrated in FIG. 1 includes a cellular network, in other embodiments the heterogeneous wireless network 5 does not include a cellular network. For example, in some embodiments, cellular networks 10, 12, 14 and relay network 16 are instead overlapping wireless local area networks (WLANs) and/or wireless personal area networks (WPANs).

The various wireless communication devices of heterogeneous wireless network 5 communicate via wireless communication links. In the embodiment illustrated in FIG. 1, base station 20 and user device 22 of macro cell network 10 communicate via wireless communication link 40, base station 26 and user device 28 of pico cell network 12 communicate via wireless communication link 42, base station 30 and user device 32 of femto cell network 14 communicate via wireless communication link 44, and relay base station 36 and user device 38 of relay network 16 communicate via wireless communication link 46. In embodiments and/or scenarios where macro cell network 10 also acts as a donor cell, relay base station 36 and (donor) base station 20 communicate via wireless communication link 48.

In operation, the various networks of the heterogeneous wireless network 5 utilize one or more wireless communication protocols for the networks supporting wireless communication links 40, 42, 44, 46, and 48. For example, each of the cell networks 10, 12, 14, and the relay network 16 utilize a 3GPP LTE protocol, in an embodiment. Using 3GPP LTE terminology, each of the base stations 20, 26, 30, and 36 is referred to as an "evolved Node B" or "E-UTRAN Node B" (eNB), and each of the user devices 22, 28, 32, and 38 is referred to as "user equipment" (UE). In other embodiments, the cell networks 10, 12, 14 and relay network 16 share a different wireless communication protocol. For example, each of the cell networks 10, 12, 14, and the relay network 16 utilize a WiMAX protocol, in an embodiment. As another example, each of the cell networks 10, 12, 14, and the relay network 16 utilize a UMTS protocol, in an embodiment. In still other embodiments, the cell networks 10, 12, 14 and/or the relay network 16 utilize multiple, different wireless communication protocols.

The user devices 22, 28, 32, 38 are configured to operate according to the wireless communication protocol of the corresponding network within heterogeneous wireless network 5 (e.g., user device 22 utilizes the protocol of macro cell network 10, user device 28 utilizes the protocol of pico cell network 12, etc.). Moreover, in some embodiments, one or more of the user devices 22, 28, 32, 38 are additionally configured to operate according to at least one other wireless communication protocol of another, coexisting wireless network (not shown in FIG. 1). For example, in some scenarios and/or embodiments, one or more of the user devices 22, 28, 32, 38 utilize a WiFi protocol to communicate with a WiFi access point (AP), a Bluetooth protocol to support use of wireless peripherals/devices (e.g., a wireless headset), and/or a global positioning system (GPS) protocol to support one or more user device applications (e.g., a navigation application).

Within the example heterogeneous wireless network 5, a first TDM interference mitigation scheme is utilized to reduce a degradation of signal quality due to interference between a first wireless communication link and a second wireless communication link. For example, the first TDM interference mitigation scheme is utilized to mitigate interference between i) data transmissions over wireless communication link 40 within macro cell network 10 and ii) data transmissions over wireless communication link 42 within pico cell network 12, in an embodiment. As another example, the first scheme is utilized to mitigate interference between i) data transmissions over wireless communication link 44 within femto cell network 14 and ii) data transmissions over wireless communication link 40 within macro cell network 10, in an embodiment. As yet another example, the first scheme is utilized to mitigate interference between i) data transmissions over wireless communication link 46 within relay network 16 and ii) data transmissions over wireless communication link 48 within macro cell network 10, in an embodiment.

The first TDM interference mitigation scheme utilizes a set of time intervals to schedule data transmissions within the first wireless communication link and data transmissions within the second wireless communication link. In one example embodiment, where the first wireless communication link operates according to a 3GPP LTE protocol, and where the interference mitigation scheme is utilized to prevent one of wireless communication links 40, 42, 44 from interfering with another of wireless communication links 40, 42, 44, the time intervals are almost blank subframe (ABS) subframes (e.g., subframes that contain no data, contain only control signals, etc.). ABS subframes are discussed in more detail below in connection with FIGS. 3A-3B. In another example embodiment, where the first wireless communication link operates according to a 3GPP LTE protocol, and where the interference mitigation scheme is utilized to prevent wireless communication link 46 from interfering with wireless communication link 48, the time intervals are multicast broadcast single frequency network (MBSFN) subframes (e.g., subframes that contain no data, contain only control signals, etc.). MBSFN subframes are discussed in more detail below in connection with FIGS. 4A-4B.

In some embodiments, the first TDM interference mitigation scheme is utilized only for purposes of reducing interference caused by downlink communications within the first wireless communication link. For example, in one embodiment where ABS subframes are utilized to prevent transmissions over wireless communication link 40 from interfering with the wireless communication link 42, the ABS subframes designate times during which the base station 20 cannot transmit data (or can only transmit control signals, etc.) to user device 22 over the wireless communication link 40, while the user device 22 may transmit any data to base station 20 over the wireless communication link 40. Alternatively, in other embodiments, the ABS subframes designate times during which both uplink and downlink transmissions of wireless communication link 40 are restricted.

In some embodiments, the first TDM interference mitigation scheme reduces interference in a reciprocal manner. For example, in some embodiments where ABS subframes are utilized to prevent transmissions over wireless communication link 40 from interfering with wireless communication link 42, non-ABS time intervals (e.g., time intervals that are orthogonal in time to the ABS subframes) designate times during which transmissions over wireless communication link 42 are restricted, thereby preventing interference with wireless communication link 40. In other of these embodiments, data transmissions over wireless communication link 42 are not restricted based on location of ABS subframes.

Also within the example heterogeneous wireless network 5, a second TDM interference mitigation scheme is utilized to reduce the degradation of signal quality due to interference between the first wireless communication link (as described above in connection with the first interference mitigation scheme) and a third wireless communication link (not shown in FIG. 1). For example, the second scheme is utilized to mitigate interference between i) data transmissions of wireless communication link 40 within macro cell network 10 and ii) data transmissions of a wireless communication link within a WiFi network that includes the user device 22 and a WiFi AP, in an embodiment. As another example, the second scheme is utilized to mitigate interference between i) data transmissions of wireless communication link 40 within macro cell network 10 and ii) data transmissions of a wireless communication link within a Bluetooth network that includes the user device 22 and a Bluetooth device such as a wireless headset, in an embodiment. As yet another example, the second scheme is utilized to mitigate interference between i) data transmissions of wireless communication link 40 within macro cell network 10 and ii) data transmissions of a wireless communication link within a GPS network that includes the user device 22 and GPS satellites, in an embodiment.

The second TDM interference mitigation scheme utilizes a set of time intervals to schedule data transmissions of the first wireless communication link and data transmissions of the third wireless communication link. In one example embodiment, the time intervals are sleep mode time intervals during which a user device of the first wireless communication link is not awake, or is not required to be awake (e.g., while a base station is not transmitting over the first wireless communication link). In another example embodiment, the time intervals are measurement gap time intervals during which a user device of the first wireless communication link is measuring signals transmitted by other base stations and/or of base stations of other cellular networks for hand-off or other purposes (e.g., while the base station currently serving the user device over the first wireless communication link is not transmitting to the user device). Sleep mode time intervals and measurement gap time intervals are discussed in more detail below in connection with FIG. 5A. In yet another example embodiment, the time intervals are unused hybrid automatic repeat request (HARQ) process subframes. HARQ process subframes are discussed in more detail below in connection with FIG. 5B.

In some embodiments, the time intervals of the second TDM interference mitigation scheme are the inverse of another set of time intervals, such as any of the example time intervals discussed above. For example, in some embodiments, the time intervals of the second TDM interference mitigation scheme are "on-duration" sleep mode time intervals that are the inverse of the sleep mode time intervals (e.g., designating when a user device should not be in sleep mode with respect to a particular wireless communication link). As another example, in some embodiments, the time intervals of the second TDM interference mitigation scheme are "non-measurement gap" time intervals that are the inverse of the measurement gap time intervals (e.g., designating when a user device should not be in a measurement gap mode with respect to a particular wireless communication link).

Similar to the first TDM interference mitigation scheme, the second TDM interference mitigation scheme is utilized only for purposes of reducing interference caused by downlink communications of the first wireless communication link in some embodiments, and is utilized for purposes of reducing interference caused by both uplink and downlink communications of the first wireless communication link in other embodiments. Also similar to the first TDM interference mitigation scheme, the second TDM interference mitigation scheme is utilized only to prevent data transmissions of the first wireless communication link from interfering with the third wireless communication link in some embodiments, and is utilized in a reciprocal manner to additionally prevent data transmissions of the third wireless communication link from interfering with the first wireless communication link in other embodiments.

The time intervals of the first interference mitigation scheme and the second interference mitigation scheme are each defined by a set of one or more parameters, such as a period, offset, and/or length (e.g., in units such as milliseconds (ms), frames, or subframes), location within a data unit (e.g., a set of subframe numbers within a frame), etc. In some embodiments, some or all of the parameters of the first interference mitigation scheme are of the same type (e.g., period, offset, etc.) as parameters of the second interference mitigation scheme. In other embodiments, each parameter of the first interference mitigation scheme differs in type from all parameters of the second interference mitigation scheme.

The heterogeneous wireless network 5 synchronizes the first and second interference mitigation schemes by determining the parameters defining the time intervals of the second interference mitigation scheme based at least in part on one or more of the parameters that define the time intervals of the first interference mitigation scheme. For example, in an embodiment, the parameter values of the second interference mitigation scheme are calculated as functions of values of one or more parameters of the first interference mitigation scheme. In some embodiments, the values of parameters of the second interference mitigation scheme are calculated subject to one or more constraints relating to the amount of overlap or offset between the time intervals of the two interference mitigation schemes (e.g., minimal overlap, maximum overlap, etc.). Example methods for determining parameters are discussed below in connection with FIGS. 7-9.

As a more specific example, in an embodiment where ABS time intervals are utilized to mitigate interference between a first wireless communication link and a second wireless communication link, and where sleep mode time intervals are utilized to mitigate interference between the first wireless communication link and a third wireless communication link, the sleep mode time intervals are synchronized with respect to the ABS time intervals, or vice versa. For example, in an embodiment, parameters for the sleep mode time intervals are determined such that the intervals overlap with the ABS time intervals as much as possible (or, alternatively, the "on-duration" sleep mode time intervals overlap with the ABS time intervals as little as possible). Example synchronized time intervals, and example methods for synchronizing time intervals of interference mitigation schemes, are discussed below in connection with FIGS. 6-9.

In some embodiments, the determination of parameter sets for the time intervals of the first and second TDM interference mitigation schemes in heterogeneous wireless network 5 is performed by a network controller or other wireless communication network device. In some embodiments, for example, a base station such as base station 20 acts as the network controller. In other embodiments, the network controller is a separate communication device (not shown in FIG. 1) connected to one or more base stations (e.g., base stations 20, 26, 30, and/or 36) by a wired backbone network (also not shown in FIG. 1).

Once the network controller has determined the parameter sets for the time intervals of the first and second TDM interference mitigation schemes, the network controller causes the parameters to be transmitted to a group of one or more recipient communication devices, in an embodiment. The group of recipients depends on the purpose of the interference mitigation schemes that are being synchronized, as illustrated by the following two example scenarios.

A first example scenario is provided with respect to an embodiment where ABS time intervals are utilized to mitigate interference between wireless communication link 40 of macro cell network 10 and wireless communication link 42 of pico cell network 12, and sleep mode time intervals are utilized to mitigate interference between wireless communication link 40 of macro cell network 10 and a wireless communication link of another wireless communication network (e.g., a WiFi, Bluetooth, or GPS network) associated with the user device 22. In this example embodiment and scenario, the ABS time interval parameters are transmitted to base station 20 (e.g., via a backbone network, if base station 20 is not acting as network controller) and user device 22 (e.g., via base station 20) of macro cell network 10, and to base station 26 (e.g., via the backbone network) and user device 28 (e.g., via base station 26) of pico cell network 12. In this manner, the base station 20 knows when to transmit ABS subframes over wireless communication link 40, and the user device 22 knows when it will receive only ABS subframes from base station 20 over wireless communication link 40 (and can therefore, for example, turn off a portion of a chipset used for communicating with base station 20). Conversely, the base station 26 and user device 28 know when interference from macro cell network 10 will be reduced, and can plan data transmissions over wireless communication link 42 of pico cell network 12 accordingly.

Also in the first example embodiment and scenario described above, the sleep mode time interval parameters are transmitted to base station 20 (e.g., via the backbone network, if base station 20 is not acting as network controller) and user device 22 (e.g., via base station 20) of macro cell network 10, and possibly to one or more devices of the coexisting wireless communication network, such as a WiFi AP (e.g., via user device 22). In this manner, the base station 20 knows when to stop transmitting to user device 22 (or only send control signals, etc.) over wireless communication link 40, and user device 22 knows when it must be awake and when it should be in sleep mode. Conversely, the device(s) of the coexisting wireless communication network (e.g., a WiFi AP) and user device 22 know when interference from macro cell network 10 will be reduced, and can plan data transmissions over the wireless communication link of the WiFi, Bluetooth, GPS, or other network associated with user device 22 accordingly.

A second example scenario is provided with respect to an embodiment where MBSFN time intervals are utilized to mitigate interference between wireless communication link 46 of relay network 16 and wireless communication link 40 of macro cell network 10, and measurement gap time intervals are utilized to mitigate interference between wireless communication link 46 of relay network 16 and a wireless communication link of another wireless communication network (e.g., a WiFi, Bluetooth, or GPS network) associated with the user device 38. In this example embodiment and scenario, the MBSFN time interval parameters are transmitted to relay base station 36 (e.g., via a backbone network or via a wireless link from base station 20, if relay base station 36 is not acting as network controller) and user device 38 (e.g., via relay base station 36) of relay network 16, and to base station 20 (e.g., via the backbone network) of macro cell network 10. In this manner, the relay base station 36 knows when to transmit only MBSFN subframes over wireless communication link 46 and the user device 38 knows when it will receive only MBSFN subframes from relay base station 36 over wireless communication link 46 (and can therefore, for example, turn off a portion of a chipset used for communicating with relay base station 36). Conversely, the base station 20 knows when interference from relay network 16 will be reduced, and can plan data transmissions over wireless communication link 46 of relay network 16 accordingly.

Also in the second example embodiment and scenario described above, the measurement gap time interval parameters are transmitted to relay base station 36 (e.g., via the backbone network or via a wireless link from base station 20, if base station 36 is not acting as network controller) and user device 38 (e.g., via relay base station 36) of relay network 16, and possibly to one or more devices of the coexisting wireless communication network, such as a WiFi AP (e.g., via user device 38). In this manner, the relay base station 36 knows when to stop transmitting to user device 38 (or only send control signals, etc.) over wireless communication link 46, and user device 38 knows when it can stop receiving transmissions from relay base station 36 over wireless communication link 46 and start measuring signals from other base stations (e.g., for handoff). Conversely, device(s) of the coexisting wireless communication network (e.g., a WiFi AP) and user device 38 know when interference from relay network 16 will be reduced, and can plan data transmissions over the wireless communication link of the WiFi, Bluetooth, GPS, or other network of user device 38 accordingly.

Figure 2:
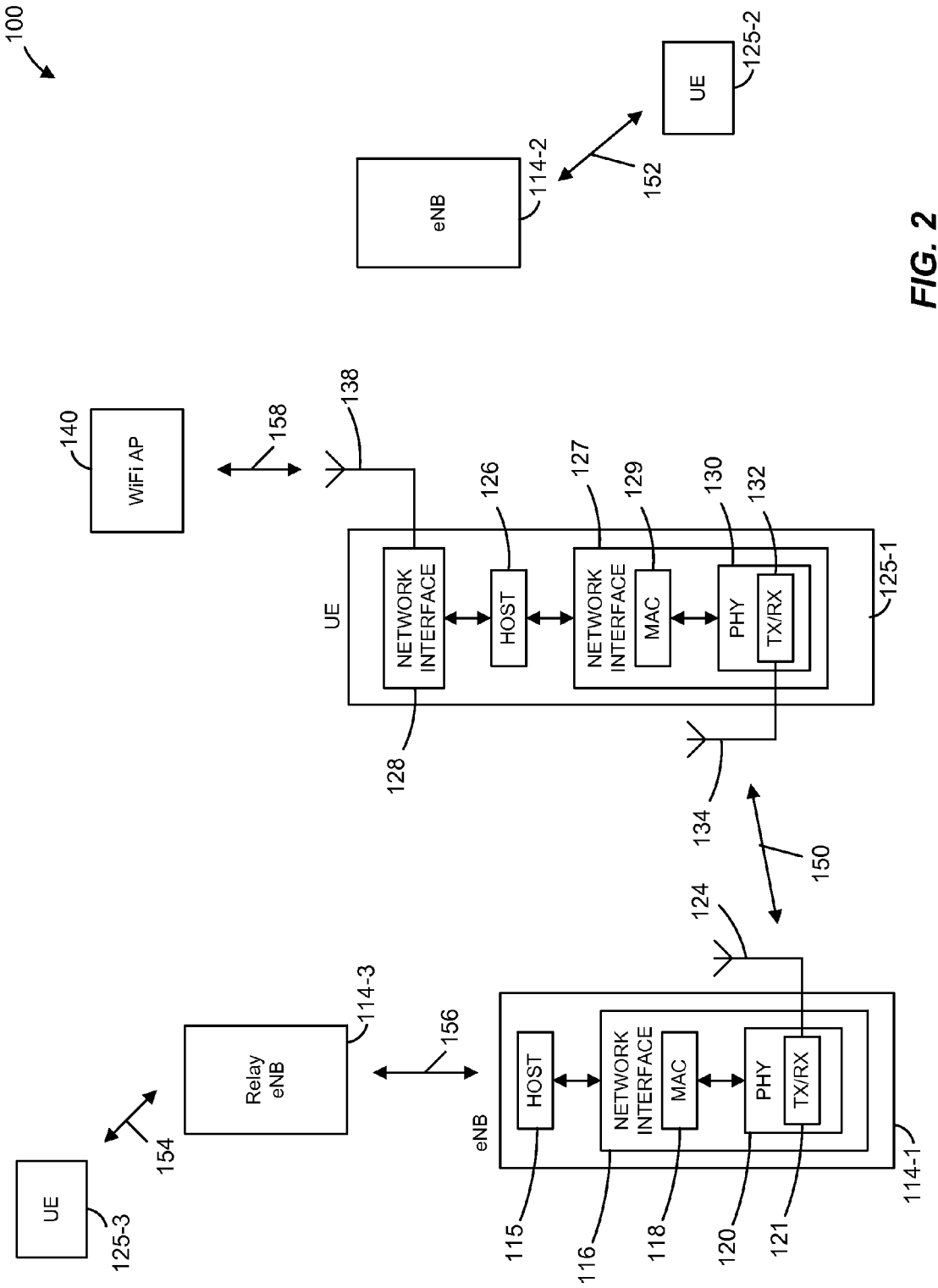
FIG. 2 is a block diagram of an example heterogeneous wireless network that implements synchronized interference mitigation techniques such as techniques described in the present disclosure, according to an embodiment.

FIG. 2 is a block diagram of an example heterogeneous wireless network 100 that implements synchronized interference mitigation techniques of the present disclosure, according to an embodiment. In an embodiment, the wireless communication devices illustrated in FIG. 2 are wireless communication devices in the heterogeneous wireless network 5 of FIG. 1. For ease of explanation, the wireless communication devices of FIG. 2 are referred to as devices of a cellular network, and more specifically by using 3GPP LTE terminology (e.g., eNB and UE). Other embodiments, however, include other types of networks and wireless communication devices, such as WiMAX or 3GPP UMTS networks and wireless communication devices.

The example heterogeneous wireless network 100 includes a plurality of eNBs 114. Although three eNBs 114 are illustrated in FIG. 2, the heterogeneous wireless network 100 includes a different number (e.g., 1, 2, 4, 5, etc.) of eNBs in other embodiments. The eNB 114-1 includes a host processor 115 coupled to a network interface 116. The network interface 116 includes a medium access control (MAC) processing unit 118 and a physical layer (PHY) processing unit 120. The PHY processing unit 120 includes a transceiver 121 coupled to an antenna 124. Although one transceiver 121 and one antenna 124 are illustrated in FIG. 2, the eNB 114 includes a different number (e.g., 2, 3, 4, 5, etc.) of transceivers 121 and antennas 124 in other embodiments. In various embodiments, one or both of the eNBs 114-2 and 114-3 has a structure the same as or similar to the eNB 114-1.

The example heterogeneous wireless network 100 also includes a plurality of UEs 125. Although three UEs 125 are illustrated in FIG. 2, the heterogeneous wireless network 100 can include a different number (e.g., 1, 2, 4, 5, 6, etc.) of UEs 125 in various scenarios and embodiments. The UE 125-1 communicates with eNB 114-1 (e.g., in a macro cell network) and includes a host processor 126 coupled to a first network interface 127 and a second network interface 128. The first network interface 127 includes a MAC processing unit 129 and a PHY processing unit 130. The PHY processing unit 130 includes a transceiver 132, and the transceiver 132 is coupled to an antenna 134. Although one transceiver 132 and one antenna 134 are illustrated in FIG. 1, the UE 125-1 can include a different number (e.g., 2, 3, 4, 5, etc.) of transceivers 132 and antennas 134 in other embodiments.

In various embodiments, the second network interface 128 of the UE 125-1 has a structure similar to the structure of the first network interface 127, and is coupled to an antenna 138. The second network interface 128, however, is configured to communicate according to a WiFi protocol, allowing the UE 125-1 to communicate with a WiFi AP 140 in a WiFi network. Although the heterogeneous wireless network 100 of FIG. 2 includes a WiFi AP 140, other embodiments instead (or additionally) include elements of other wireless networks, such as a Bluetooth device (e.g., a wireless headset) or GPS network devices (e.g. satellites). In these embodiments, the second network interface 128 is configured to communicate according to the appropriate protocol (e.g., a Bluetooth protocol, GPS protocol, etc.). In various embodiments, one or both of the UEs 125-2 and 125-3 has a structure the same as or similar to the UE 125-1.

In an embodiment, the various wireless communication devices of heterogeneous wireless network 5 of FIG. 1 are similar to the wireless communication devices within the heterogeneous wireless network 100 of FIG. 2. For example, in an embodiment, base station 20 of macro cell network 10 in FIG. 1 is similar to eNB 114-1, base station 26 of pico cell network 12 (or base station 30 of femto cell network 14) in FIG. 1 is similar to eNB 114-2, relay base station 36 of relay network 16 in FIG. 1 is similar to eNB 114-3, user device 22 of macro cell network 10 in FIG. 1 is similar to UE 125-1, user device 28 of pico cell network 12 (or user device 32 of femto cell network 14) in FIG. 1 is similar to UE 125-2, and user device 38 of relay network 16 in FIG. 1 is similar to UE 125-3. In this embodiment, wireless communication link 40 in FIG. 1 is similar to wireless communication link 150, wireless communication link 42 (or wireless communication link 44) in FIG. 1 is similar to wireless communication link 154, wireless communication link 46 in FIG. 1 is similar to wireless communication link 154, and wireless communication link 48 in FIG. 1 is similar to wireless communication link 156.

The heterogeneous wireless network 100 utilizes at least two TDM interference mitigation schemes. In various embodiments, the TDM interference mitigation schemes are similar to any of the TDM interference mitigation schemes discussed above in connection with heterogeneous wireless network 5 of FIG. 1. In a first synchronization example, a first interference mitigation scheme (e.g., the use of ABS time intervals) is utilized to mitigate interference between wireless communication link 150 and wireless communication link 152, while a second interference scheme (e.g., the use of sleep mode, measurement gap, or HARQ process time intervals) is utilized to mitigate interference between wireless communication link 150 and wireless communication link 158. In a second synchronization example, a first interference mitigation scheme (e.g., the use of MBSFN time intervals) is utilized to mitigate interference between wireless communication link 154 and wireless communication link 156, while a second interference scheme (e.g., the use of sleep mode, measurement gap, or HARQ process time intervals) is utilized to mitigate interference between wireless communication link 154 and a wireless link (not shown in FIG. 2) of a network (e.g., a WiFi, Bluetooth, or GPS network) that includes UE 125-3 and at least one other device (e.g., a WiFi AP) of that network.

The heterogeneous wireless network 100 synchronizes the first and second interference mitigation schemes. For example, in various embodiments, the heterogeneous wireless network 100 synchronizes the first and second interference mitigation schemes according to any of the methods discussed above in connection with FIG. 1. In some embodiments, the parameters defining the synchronized time intervals of the two interference mitigation schemes are determined by a network controller or other wireless communication network device. In some embodiments, the eNB 114-1 (e.g., host 115 of eNB 114-1) acts as a network controller. In other embodiments, a different eNB acts as the network controller. In still other embodiments, the network controller is a network device (not shown in FIG. 2) that communicates with one or more other eNBs (e.g., eNB 114-1) via a wired backbone network (also not shown in FIG. 2).

Once the parameters for the time intervals of the first and second interference schemes have been determined (e.g., by a network controller), the parameters are transmitted (e.g., by the network controller, or in response to a command from the network controller) to the appropriate wireless communication devices. For example, corresponding to the first synchronization example given above, a network controller causes parameters defining the ABS time intervals to be transmitted to eNB 114-1 (e.g., via a wired backbone network), UE 125-1 (e.g., via eNB 114-1), eNB 114-2 (e.g., via the wired backbone network), and UE 125-2 (e.g., via eNB 114-2), and causes the parameters defining the time intervals of the second interference scheme (e.g., the use of sleep mode, measurement gap, or HARQ process time intervals) to be transmitted to eNB 114-1 (e.g., via the wired backbone network), UE 125-1 (e.g., via eNB 114-1), and WiFi AP 140, in an embodiment. As another example, corresponding to the second synchronization example given above, a network controller causes parameters defining the MBSFN time intervals to be transmitted to eNB 114-3 (e.g., via a wired backbone network), UE 125-3 (e.g., via eNB 114-3), and eNB 114-1 (e.g., via the wired backbone network), and causes the parameters defining the time intervals of the second interference scheme (e.g., the use of sleep mode, measurement gap, or HARQ process time intervals) to be transmitted to eNB 114-3 (e.g., via the wired backbone network or via a wireless link from eNB 114-1), UE 125-3 (e.g., via eNB 114-3), and possibly other devices in a wireless network associated with UE 125-3 (e.g., a WiFi AP, Bluetooth device, etc.), in an embodiment.

When eNB 114-1 receives parameters defining time intervals of synchronized interference mitigation schemes, the network interface 116 (e.g., the PHY interface 120) ensures that the data transmissions of eNB 114-1 are in accordance with any protocol requirements corresponding to the time intervals. For example, in one embodiment and scenario where eNB 114-1 receives parameters defining a set of ABS time intervals and parameters defining a set of sleep mode time intervals, the network interface 120 ensures that eNB 114-1 transmits no data (or only control signals, etc.) during the ABS and sleep mode time intervals. In some embodiments, one or both of eNB 114-2 and eNB 114-3 behave in a manner similar to eNB 114-1 when receiving parameters of interference mitigation time intervals.

Likewise, when UE 125-1 receives parameters defining time intervals of synchronized interference mitigation schemes, the network interface 127 (e.g., the PHY interface 130) ensures that the data transmissions of UE 125-1 are in accordance with any protocol requirements corresponding to the time intervals. For example, in one embodiment and scenario where the UE 125-1 receives parameters defining a set of ABS time intervals and parameters defining a set of sleep mode time intervals, the network interface 127 ensures that least a portion of a chipset of network interface 127 in UE 125-1 is turned off during the ABS time intervals, and that the chipset follows any sleep mode rules during the sleep mode time intervals (such as a requirement that the chipset be powered down, that the chipset is permitted to wake up only if UE 125-1 has reason to expect a certain kind of data transmission, etc.). In some embodiments, one or both of UE 125-2 and UE 125-3 behave in a manner similar to UE 125-1 when receiving parameters of interference mitigation time intervals.

Figure 3A:
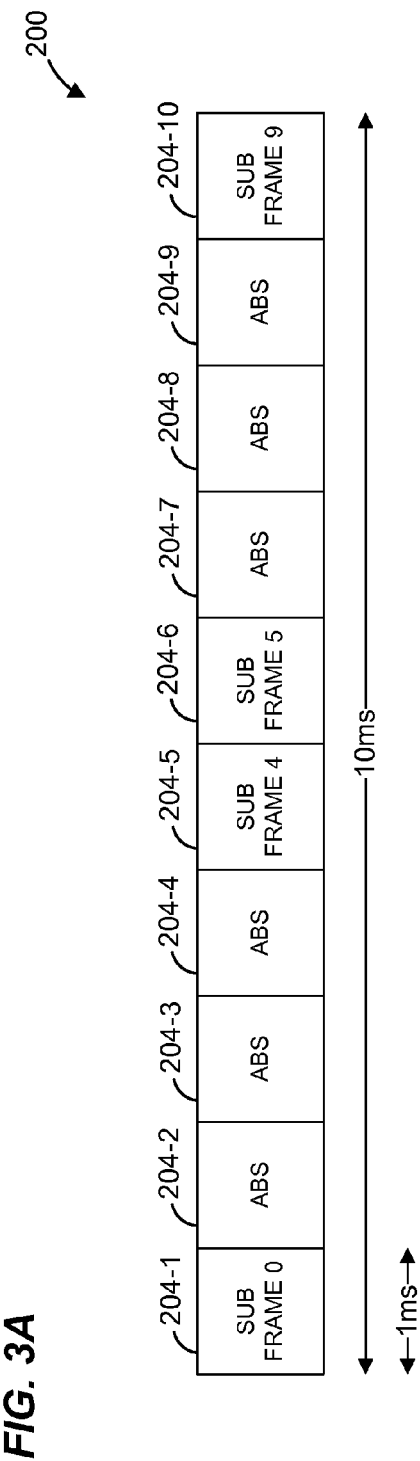
FIG. 3A is a diagram of an example data unit that includes ABS time intervals for mitigating interference between wireless communication links, according to an embodiment.

FIG. 3A is a diagram of an example data unit 200 that includes ABS time intervals for mitigating interference between wireless communication links, according to an embodiment. In one embodiment and scenario, the data unit 200 corresponds to a data unit transmitted over wireless communication link 40 of FIG. 1 (e.g., from base station 20 to user device 22). In another embodiment and scenario, the data unit 200 corresponds to a data unit transmitted over wireless communication link 150 of FIG. 2 (e.g., from eNB 114-1 to UE 125-1).

The example data unit 200 is a 10 ms frame that includes ten 1 ms subframes 204. While the example data unit 200 of FIG. 3A is a frame having ten subframes 204-1 through 204-10 (i.e., subframe 0 through subframe 9), other data unit formats are used in other embodiments. For example, the data unit 200 includes more or fewer than ten subframes 204 in some embodiments.

The example data unit 200 includes time intervals corresponding to a single interference mitigation scheme. Specifically, in the embodiment of FIG. 3A, the data unit 200 includes ABS subframes 204-2 through 204-4 at subframes 1 through 3, and ABS subframes 204-7 through 204-9 at subframes 6 through 8. The locations of the ABS subframes within the frame of data unit 200 may be expressed in terms of a parameter Sa. For the data unit 200, for example, Sa is equal to {1, 2, 3, 6, 7, 8}. In other embodiments and/or scenarios, the data unit 200 includes more or fewer than six ABS subframes, or the ABS subframes 204-2 through 204-4 and 204-7 and 204-9 are in different subframe locations within data unit 200. Moreover, in some embodiments, Sa depends on whether wireless link communications are in a time division duplex (TDD) mode or a frequency division duplex (FDD) mode. For example, Sa is equal to {3, 4, 7, 8, 9} when in a TDD mode and is equal to {1, 2, 3, 6, 7, 8} when in an FDD mode, in an embodiment.

Depending on the protocol of the wireless communication network implementing the ABS subframes, various rules must be followed during each ABS subframe. In some embodiments, only control signals may be transmitted during each ABS subframe (e.g., no user-specific, payload data may be transmitted) over the downlink and, in one embodiment, over the uplink. In other embodiments, no data transmissions of any kind are permitted during each ABS subframe over the downlink and/or uplink. In some embodiments, a user device in a wireless communication link that utilizes ABS subframes shuts down (or partially shuts down) a chipset during each ABS subframe, where the user device normally uses the chipset to receive data transmissions over the wireless communication link.

Figure 3B:
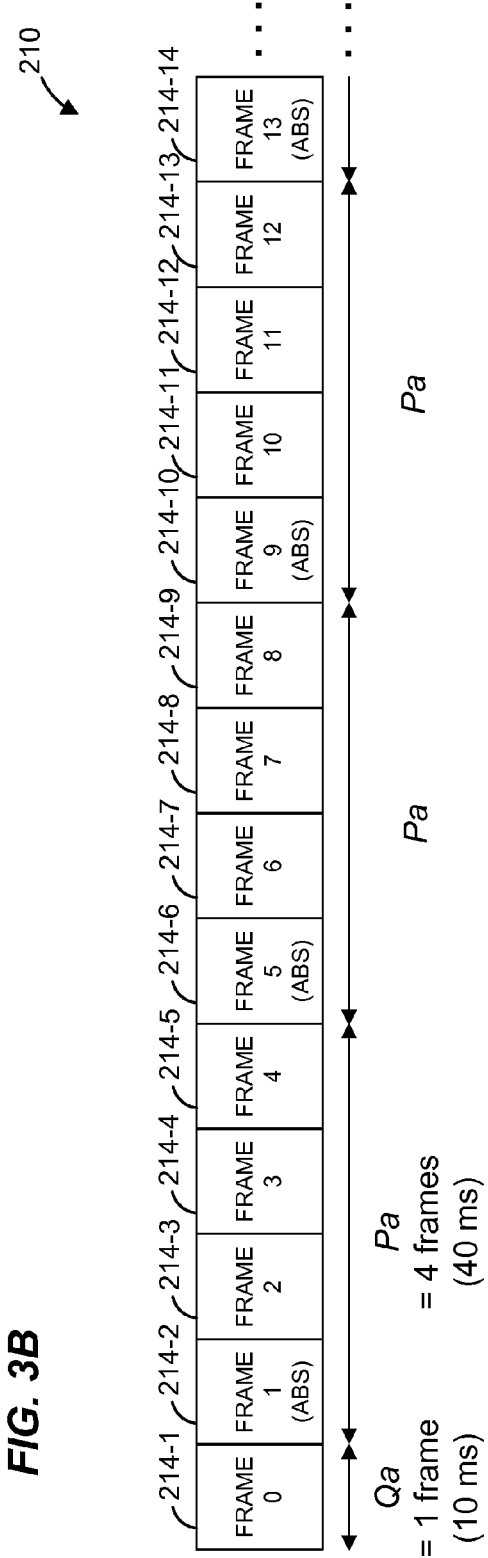
FIG. 3B is a diagram of an example series of data units that includes data units similar to the data unit of FIG. 3A, according to an embodiment.

FIG. 3B is a diagram of an example series 210 of data units 214 that includes data units similar to the data unit 200 of FIG. 3A, in an embodiment. Specifically, the example series 210 includes frames 214, of which particular frames (including frames 214-2, 214-6, 214-10, and 214-14) include one or more ABS subframes. As used herein, "time intervals" may refer to time intervals within a single data unit (e.g., locations of a specific type of subframe within a frame), to time intervals across multiple data units (e.g., locations of the frames that include one or more of the specific type of subframe), or both. In one embodiment and scenario, each of ABS frames 214-2, 214-6, 214-10, and 214-14 is the same as data unit 200, while the remaining frames shown in FIG. 3B do not include any ABS subframes. The locations of the ABS frames 214-2, 214-6, 214-10, and 214-14 within the series 210 may be expressed in terms of one or more parameters, such as a period Pa and offset Qa. For the series 210, for example, Pa is equal to 4 frames (40 ms) and Qa is equal to 1 frame (10 ms). In other embodiments and/or scenarios, the period Pa is greater than or less than 4 frames, and/or the offset Qa is greater than or less than 1 frame. For example, the period Pa is any one of 1, 2, 4, 8, 16, or 32 frames and the offset Qa is any one of 0 to 7 frames, according to various embodiments. In some embodiments, the offset Qa is always less than the period Pa.

Figure 4A:
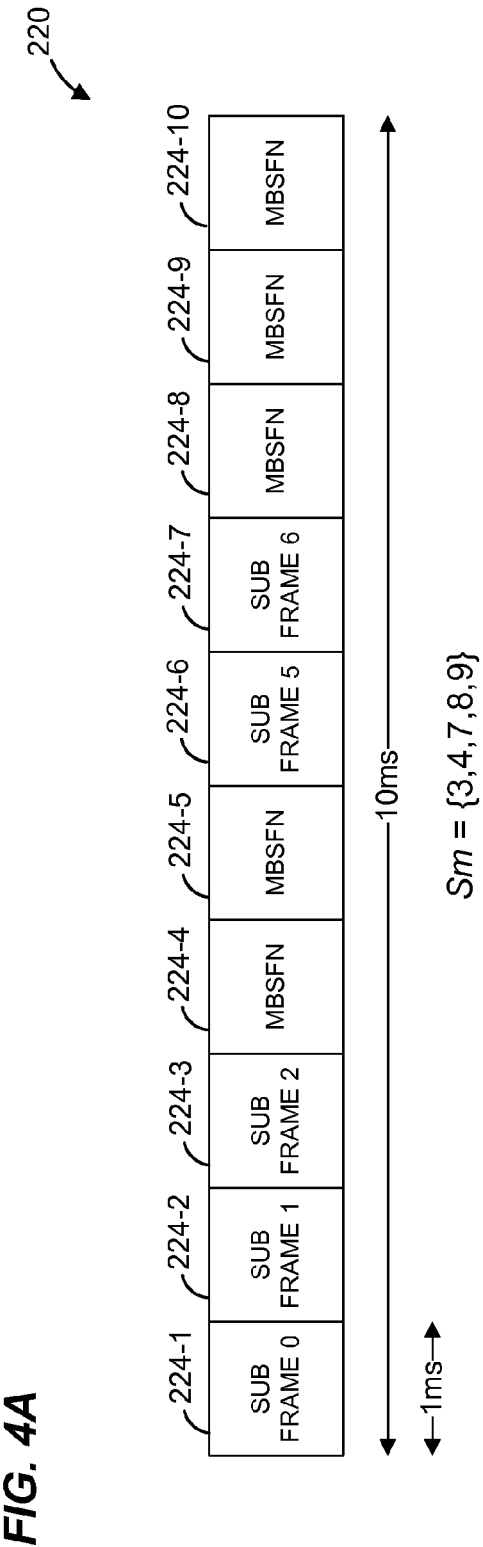
FIG. 4A is a diagram of an example data unit that includes MBSFN time intervals for mitigating interference between wireless communication links, according to an embodiment.

FIG. 4A is a diagram of an example data unit 220 that includes MBSFN time intervals for mitigating interference between wireless communication links, according to an embodiment. In one embodiment and scenario, the data unit 220 corresponds to a data unit transmitted over wireless communication link 46 of FIG. 1 (e.g., from relay base station 36 to user device 38). In another embodiment and scenario, the data unit 220 corresponds to a data unit transmitted over wireless communication link 154 of FIG. 2 (e.g., from relay eNB 114-3 to UE 125-3).

The example data unit 220 is a 10 ms frame that includes ten 1 ms subframes 224. While the example data unit 220 of FIG. 4A is a frame having ten subframes 224-1 through 224-10 (i.e., subframe 0 through subframe 9), other data unit formats are used in other embodiments. For example, the data unit 220 includes more or fewer than ten subframes 224 in some embodiments.

The example data unit 220 includes time intervals corresponding to a single interference mitigation scheme. Specifically, in the embodiment of FIG. 4A, the data unit 220 includes MBSFN subframes 224-4 and 224-5 at subframes 3 and 4, and MBSFN subframes 224-8 through 224-10 at subframes 7 through 9. The locations of the MBSFN subframes within the frame of data unit 220 may be expressed in terms of a parameter Sm. For the data unit 220, for example, Sm is equal to {3, 4, 7, 8, 9}. In other embodiments and/or scenarios, the data unit 220 includes more or fewer than five MBSFN subframes, or the MBSFN subframes 224-4, 224-5, and 224-8 through 224-10 are in different subframe locations within data unit 220. Moreover, in some embodiments, Sm depends on whether wireless link communications are in a TDD mode or an FDD mode. For example, Sm is equal to {3, 4, 7, 8, 9} when in a TDD mode and is equal to {1, 2, 3, 6, 7, 8} when in an FDD mode, in an embodiment.

Depending on the protocol of the wireless communication network implementing the MBSFN subframes, various rules must be followed during each MBSFN subframe. In some embodiments, only control signals may be transmitted during each MBSFN subframe (e.g., no user-specific, payload data may be transmitted) over the downlink and, in one embodiment, over the uplink. In other embodiments, no data transmissions of any kind are permitted during each MBSFN subframe over the downlink and/or uplink. In some embodiments, a user device in a wireless communication link that utilizes MBSFN subframes shuts down (or partially shuts down) a chipset during each MBSFN subframe, where the user device normally uses the chipset to receive data transmissions over the wireless communication link.

Figure 4B:
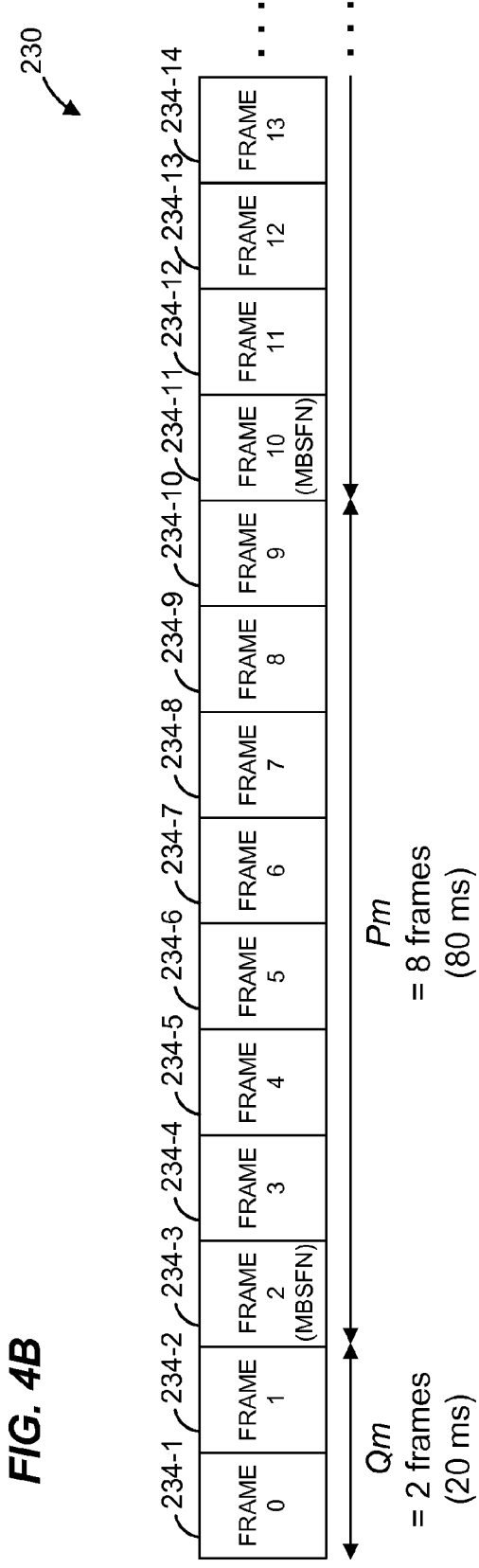
FIG. 4B is a diagram of an example series of data units that includes data units similar to the data unit of FIG. 4A, according to an embodiment.

FIG. 4B is a diagram of an example series 230 of data units 234 that includes data units similar to the data unit 220 of FIG. 4A, in an embodiment. Specifically, the example series 230 includes frames 234, of which particular frames (including frames 234-3 and 234-11) include one or more MBSFN subframes. In one embodiment and scenario, each of MBSFN frames 234-3 and 234-11 is the same as data unit 220, while the remaining frames shown in FIG. 4B do not include any MBSFN subframes. The locations of the MBSFN frames 234-3 and 234-11 within the series 220 may be expressed in terms of one or more parameters, such as a period Pm and offset Qm. For the series 220, for example, Pm is equal to 8 frames (80 ms) and Qm is equal to 2 frames (20 ms). In other embodiments and/or scenarios, the period Pm is greater than or less than 8 frames, and/or the offset Qm is greater than or less than 2 frames. For example, the period Pm is any one of 1, 2, 4, 8, 16, or 32 frames and the offset Qm is any one of 0 to 7 frames, according to various embodiments. In some embodiments, the offset Qm is always less than the period Pm.

Figure 5A:
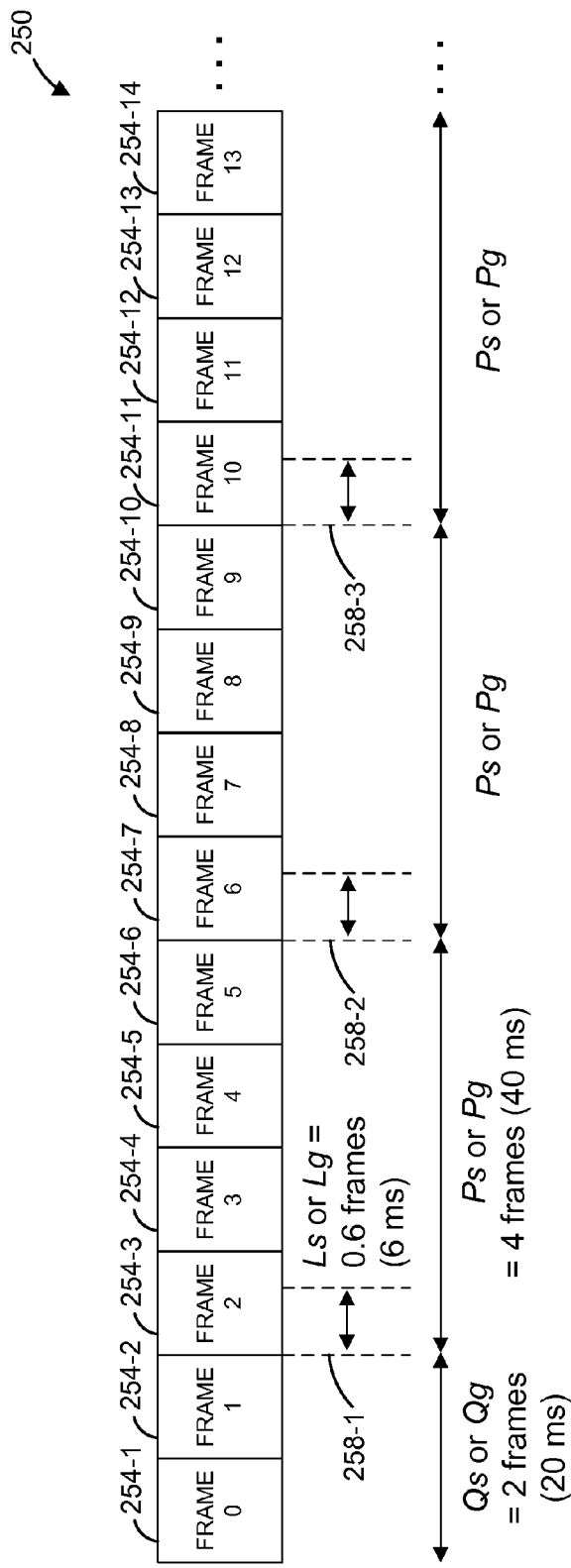
FIG. 5A is a diagram of an example series of data units that includes on-duration sleep mode or measurement gap time intervals for mitigating interference between wireless communication links, according to an embodiment.

FIG. 5A is a diagram of an example series 250 of data units 254 that includes on-duration sleep mode or non-measurement gap time intervals 258 for mitigating interference between wireless communication links, according to an embodiment. As explained above, "on-duration" sleep mode time intervals are the inverse of sleep mode time intervals, and "non-measurement gap" time intervals are the inverse of the measurement gap time intervals. In an embodiment, each example data unit 254 in the series 250 is a 10 ms frame that includes ten 1 ms subframes (not shown in FIG. 5A). In other embodiments, each data unit 254 instead has a different format, such as a data unit that includes more or fewer than ten subframes. In one embodiment and scenario, the series 250 of data units 254 corresponds to a series of data units transmitted over wireless communication link 40 of FIG. 1 (e.g., from base station 20 to user device 22). In another embodiment and scenario, the series 250 of data units 254 corresponds to a series of data units transmitted over wireless communication link 150 of FIG. 2 (e.g., from eNB 114-1 to UE 125-1).

Depending on the protocol of the wireless communication network implementing the on-duration sleep mode or non-measurement gap time intervals 258, various rules must be followed between and/or during each time interval 258. In some embodiments, no data transmissions of any kind are permitted between each on-duration sleep mode or non-measurement gap time interval 258 over the downlink and/or uplink. In some embodiments where the time intervals 258 are on-duration sleep mode time intervals, a chipset of a user device (e.g., a chipset in network interface 127 of FIG. 2) may be powered down or in low-power mode between (but not during) each of the on-duration sleep mode time intervals 258. In some embodiments where the time intervals 258 are non-measurement gap time intervals, a user device does not have to actively listen to the base station currently serving the user device between each of the non-measurement gap time intervals 258, and the user device is permitted to measure signals from other base stations (e.g., to prepare for hand-off) between (but not during) each of the non-measurement gap time intervals 258.

The locations of the on-duration sleep mode or non-measurement gap time intervals 258 within the series 250 may be expressed in terms of one or more parameters, such as a period Ps or Pg, an offset Qs or Qg, and/or a length Ls or Lg, respectively. For the example series 250, for instane, Ps or Pg is equal to 4 frames (40 ms), Qs or Qg is equal to 2 frames (20 ms), and Ls or Lg is equal to 0.6 frames (6 ms). In other embodiments and/or scenarios, the period Ps or Pg is greater than or less than 4 frames, the offset Qs or Qg is greater than or less than 2 frames, and/or the length Ls or Lg is greater than or less than 0.6 frames. For example, the period Ps can be any one of 1, 2, 3.2, 4, 6.4, 8, 12.8, 16, 25.6, 32, 51.2, 64, 102.4, 128, 204.8, or 256 frames, the offset Qs can be any non-negative integer less than Ps, and the length Ls can be any one of 0.1, 0.2, 0.3, 0.4, 0.5, 0.6, 0.8, 1, 2, 3, 4, 5, 6, 8, 10, or 20 frames, according to various embodiments utilizing on-duration sleep mode time intervals. As another example, the period Pg can be either 4 or 6 frames, the offset Qg can be any non-negative integer less than Pg, and the length Lg is 0.6, according to various embodiments utilizing non-measurement gap time intervals.

Figure 5B:
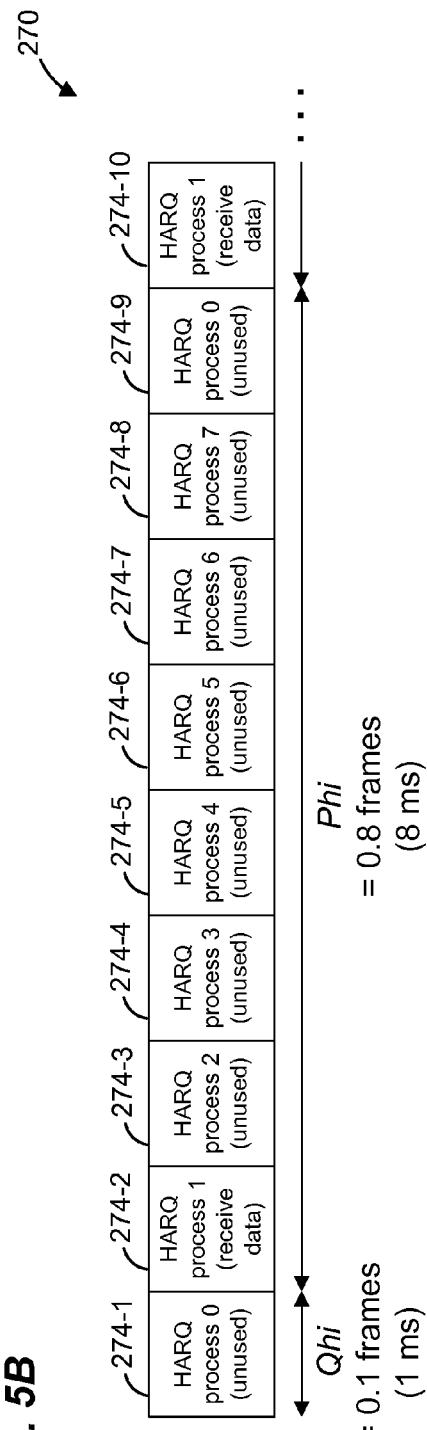
FIG. 5B is a diagram of an example data unit that includes HARQ process time intervals for mitigating interference between wireless communication links, according to an embodiment.

FIG. 5B is a diagram of an example data unit 270 that includes HARQ process time intervals for mitigating interference. In an embodiment, the data unit 270 is a 10 ms frame and each HARQ processes includes two 1 ms subframe time intervals: a first subframe for an initial data transmission over a wireless communication link, and a second subframe for retransmission of the data or another initial data transmission of the same HARQ process. The example data unit 270 includes eight HARQ processes (process number 0 through process number 7) within subframes 274. Of the eight HARQ processes, processes 0 and 2 through 7 are unused (e.g., do not correspond to any data transmission, or to any data retransmission), while process 1 (subframes 274-2 and 274-10) is a used HARQ process for data transmissions and retransmissions. By including unused HARQ process time intervals, a wireless communication network can lessen interference with coexisting wireless communication networks during the unused HARQ process subframes.

In one embodiment and scenario, the data unit 270 corresponds to a data unit transmitted over wireless communication link 40 of FIG. 1 (e.g., from base station 20 to user device 22). In another embodiment and scenario, the data unit 270 corresponds to a data unit transmitted over wireless communication link 150 of FIG. 2 (e.g., from eNB 114-1 to UE 125-1).

In some embodiments and scenarios, the time intervals corresponding to used HARQ processes are not uniform across data units. In the data unit 270 illustrated in FIG. 5B, for example, the used HARQ process subframes 274-2, 274-10 recur every eight subframes. Thus, the used HARQ process subframes occur at subframes 1 and 9 of data unit 270 (as shown in FIG. 5B), but would occur at subframe 7 of the subsequent data unit, subframe 5 of the data unit after that, etc. The locations of the used HARQ process subframes may be expressed in terms of one or more parameters, such as a period Phi and/or an offset Qhi. For the example data unit 270, for example, the period Phi is equal to 0.8 frames (8 ms) and the offset Qhi is equal to 0.1 frames (1 ms). In other embodiments and/or scenarios, the period Phi is greater than or less than 0.8 frames, and/or the offset Qhi is greater than or less than 0.1 frames. For example, the period Phi is 0.8 frames when a wireless link communicates in an FDD mode and variable when a wireless link communicates in a TDD mode, in an embodiment. As another example, Qhi is i ms for a used HARQ process number i when a wireless link communicates in a FDD mode and variable when a wireless link communicates in a TDD mode, in an embodiment.

FIG. 6 is a diagram 300 illustrating example synchronized time intervals of two interference mitigation schemes, according to an embodiment. In the illustrated embodiment, a first interference mitigation scheme utilizing ABS subframe time intervals 306 is synchronized with a second interference mitigation scheme utilizing on-duration sleep mode time intervals 310. In some embodiments, the ABS subframe time intervals 306 are similar to the ABS subframes of FIGS. 3A and 3B, and the on-duration sleep mode time intervals 310 are similar to the on-duration sleep mode time intervals 258 of FIG. 5A.

In the example synchronization illustrated in FIG. 6, the ABS subframe time intervals 306 and the on-duration sleep mode time intervals 310 are aligned such that no overlap occurs between the ABS subframe time intervals 306 and the on-duration sleep mode time intervals 310. For example, as shown in FIG. 6 by the dashed lines 312 and 314, respectively, ABS subframe time interval 306-1 does not overlap on-duration sleep mode time interval 310-1, and ABS subframe time interval 306-2 does not overlap on-duration sleep mode time interval 310-3. Because the ABS subframe time intervals 306 occur when there is no on-duration sleep mode time interval (i.e., during sleep mode, when chipsets may be powered down, etc.) the ABS subframe time intervals 306 do not reduce data throughput beyond the reduction in throughput that is already caused by the sleep mode time intervals. Values for example parameters Pa, Qa, and Sa corresponding to the ABS time intervals 306 and for example parameters Ps, Ls, and Qs corresponding to the on-duration sleep mode time intervals 310 are shown in FIG. 6. In some embodiments, the parameter values are determined by a network controller (e.g., a base station such as eNB 114-1 of FIG. 2).

While FIG. 6 illustrates an example embodiment where time intervals of ABS and sleep mode interference mitigation schemes are synchronized, other embodiments synchronize time intervals of other types of interference mitigation schemes. In some embodiments, for example, time intervals of an ABS interference mitigation scheme are instead (or additionally) synchronized with time intervals of a measurement gap interference mitigation scheme. In other embodiments, time intervals of an ABS interference mitigation scheme are instead (or additionally) synchronized with time intervals of a HARQ process interference mitigation scheme. In still other embodiments, time intervals of an MBSFN interference mitigation scheme (e.g., utilizing MBSFN time intervals similar to the MBSFN subframes of FIGS. 4A and 4B) are synchronized with time intervals of sleep mode, measurement gap, and/or HARQ process interference mitigation schemes. Thus, for example, the ABS subframe time intervals 306 of FIG. 6 may be replaced with MBSFN subframe time intervals, and/or the on-duration sleep mode time intervals 310 may be replaced with non-measurement gap time intervals or used HARQ process subframe time intervals, according to various embodiments.

Figure 7:
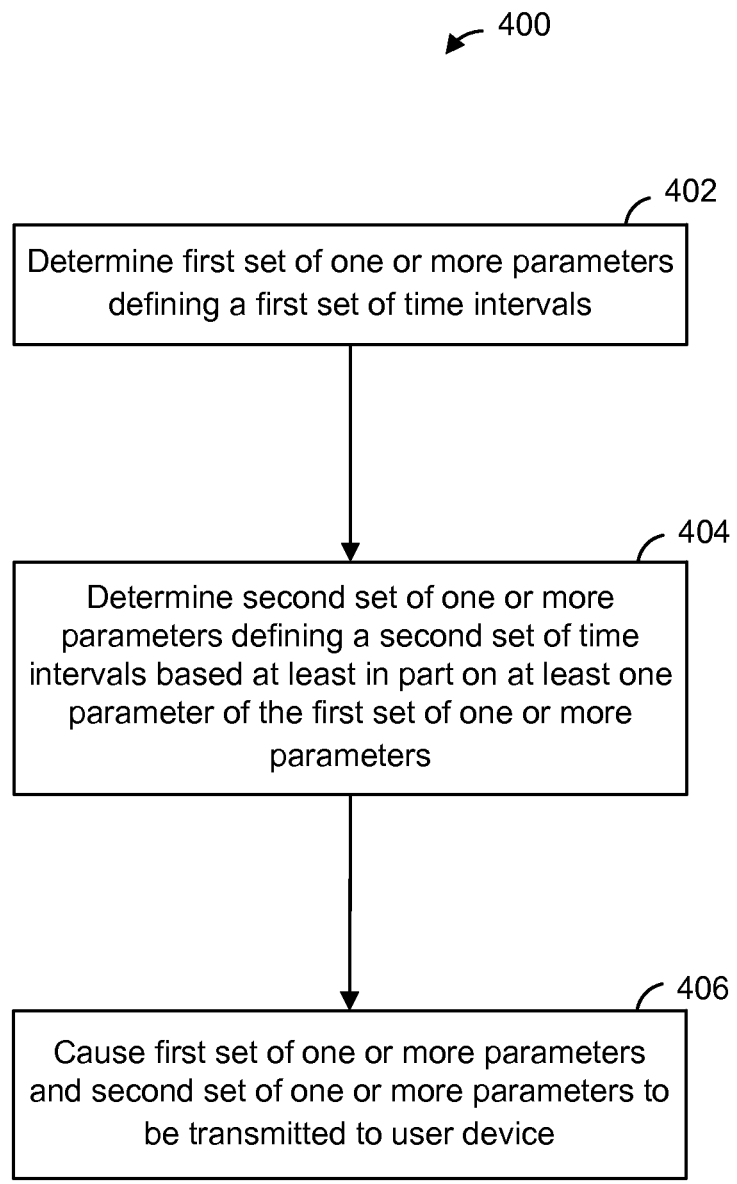
FIG. 7 is a flow diagram of an example method for synchronizing time intervals of two interference mitigation schemes, according to an embodiment.

FIG. 7 is a flow diagram of an example method 400 for synchronizing time intervals of two interference mitigation schemes. In some embodiments, a network controller, such as the base station 20, 26, 30, or 36 of FIG. 1 or the eNB 114-1, 114-2, or 114-3 of FIG. 2, is configured to implement the method 400. In other embodiments, a network controller that is not a base station, but is connected to a base station via a wired backbone network, is configured to implement the method 400. In still other embodiments, a different wireless communication network device is configured to implement the method 400. In some embodiments, the method 400 is implemented by multiple wireless communication network devices, such as a base station and a separate network controller, or a base station and a user device.

At block 402, a first set of one or more parameters that define a first set of time intervals is determined. In some embodiments, the first set of one or more parameters defines a set of ABS subframe time intervals. For example, in some embodiments, the first set of one or more parameters includes at least one of an ABS (or non-ABS) frame period, an ABS (or non-ABS) frame offset, and a set of ABS (or non-ABS) subframe locations per frame. In other embodiments, the first set of one or more parameters defines a set of MBSFN subframe time intervals. For example, in some embodiments, the first set of one or more parameters includes at least one of an MBSFN (or non-MBSFN) frame period, an MBSFN (or non-MBSFN) frame offset, and a set of MBSFN (or non-MBSFN) subframe locations per frame.

As used herein, a parameter or set of parameters is "determined" by determining the value of the parameter(s). In some embodiments, the first set of one or more parameters is determined at least in part by determining default parameter values. For example, in some embodiments, a device performing the method 400 (e.g., a network controller) knows that a particular parameter always has a particular value (e.g., a period is always 1 frame, an offset is always 0 frames, etc.). In other embodiments, the first set of one or more parameters is determined at least in part by receiving data (e.g., over a wireless communication link or wired backbone network connection) indicating the parameter value(s).

In other embodiments, the first set of one or more parameters is determined at least in part by performing calculations based on other information, such as traffic demand and/or scheduling priority. For example, in one embodiment where the first set of one or more parameters defines a set of ABS subframe time intervals, the set of one or more parameters is determined based on traffic demand and/or scheduling priority between a macro cell and a pico or femto cell (e.g., macro cell network 10 and pico cell network 12 or femto cell network 14 of FIG. 1). As another example, in one embodiment where the first set of one or more parameters defines a set of MBSFN subframe time intervals, the set of one or more parameters is determined based on traffic demand and/or scheduling priority between a relay network and a donor cell (e.g., relay network 16 and macro cell network 10 of FIG. 1).

At block 404, a second set of one or more parameters that define a second set of time intervals is determined based at least in part on at least one parameter of the first set of one or more parameters determined at block 402. In some embodiments, the second set of one or more parameters defines a set of sleep mode time intervals. For example, in some embodiments, the second set of one or more parameters includes at least one of a sleep mode (or on-duration sleep mode) time interval period, a sleep mode (or on-duration sleep mode) time interval offset, and a sleep mode (or on-duration sleep mode) length. In other embodiments, the second set of one or more parameters defines a set of measurement gap time intervals. For example, in some embodiments, the second set of one or more parameters includes at least one of a measurement gap (or non-measurement gap) time interval period, a measurement gap (or non-measurement gap) time interval offset, and a measurement gap (or non-measurement gap) time interval length.

In some embodiments, the second set of one or more parameters is determined at least in part by performing one or more calculations based on one or more parameters of the first set of parameters determined at block 402. For example, in one embodiment where the first set of one or more parameters defines a set of ABS subframe time intervals, the second set of one or more parameters is determined at least in part by performing calculations based on at least one of ABS frame period, ABS frame offset, and the location of ABS subframes within a frame. As another example, in one embodiment where the first set of one or more parameters defines a set of MBSFN subframe time intervals, the second set of one or more parameters is determined at least in part by performing calculations based on at least one of MBSFN frame period, MBSFN frame offset, and the location of MBSFN subframes within a frame.

In some embodiments, the second set of one or more parameters is determined such that the second set of time intervals maximally overlaps (or minimally overlaps) the first set of time intervals. For example, in some embodiments where the first set of one or more parameters defines a set of ABS subframe time intervals and the second set of one or more parameters defines a set of sleep mode or measurement gap time intervals, the second set of one or more parameters is determined such that the second set of time intervals maximally overlaps the first set of time intervals. As another example, in some embodiments where the first set of one or more parameters defines a set of ABS subframe time intervals and the second set of one or more parameters defines a set of on-duration sleep mode or non-measurement gap time intervals, the second set of one or more parameters is determined such that the second set of time intervals minimally overlaps the first set of time intervals.

In some embodiments, one or more parameters of the second set of parameters are not determined based on any parameters of the first set of parameters. In one embodiment, at least one parameter of the second set of one or more parameters is determined by determining default parameter values, and/or by receiving data (e.g., over a wireless communication link or wired backbone network connection) indicating the parameter value(s). In another embodiment, at least one parameter of the second set of one or more parameters is determined by selecting from one or more sets of parameter values, and/or calculating one or more parameter values, based on information other than the first set of one or more parameters. As one example, in an embodiment where the second set of one or more parameters defines a set of on-duration sleep mode or non-measurement gap time intervals, the second set of one or more parameters includes a length parameter that is determined based on at least one of traffic demand and scheduling priority between two wireless communication networks (e.g., the macro cell network 10 and a WiFi, Bluetooth, or GPS network associated with user device 22 in FIG. 1). As another example, in an embodiment where the second set of one or more parameters defines a set of on-duration sleep mode or non-measurement gap time intervals, the second set of one or more parameters includes a period parameter that is determined at least in part based on whether a wireless communication network (e.g., a WiFi, Bluetooth, or GPS network associated with user device 22 in FIG. 1) is in a first mode or a second mode (e.g., a first mode corresponding to heavy activity or a second mode corresponding to light activity).

At block 406, each of the first set of one or more parameters and the second set of one or more parameters is caused to be transmitted to a user device. Referring to FIG. 1, for example, the sets of parameters are caused to be transmitted to user device 22 or user device 38, in various embodiment and/or scenarios. Referring to FIG. 2, as another example, the sets of parameters are caused to be transmitted to UE 125-1 or UE 125-3, in various embodiment and/or scenarios.

In some embodiments, the parameter sets are caused to be transmitted by generating data indicating that the parameter sets must be transmitted to the user device. In other embodiments, the parameter sets are caused to be transmitted merely by transmitting (or causing a transmission of) the parameter sets to a different wireless communication network device. In one embodiment, for example, a network controller performing the method 400 causes the parameter sets to be transmitted to a user device simply by transmitting the parameter sets to a base station (e.g., via a wired backbone network), where the base station serves a cell within which the user device is located. The base station then automatically forwards the parameter sets to the user device after receiving the parameter sets from the network controller.

In some embodiments, block 406 is omitted, and/or additional blocks are added. For example, in one embodiment, an additional block is included in method 400 in which the first and second sets of parameters are caused to be transmitted to a base station serving the user device referenced in block 406. In some embodiments, the order of the blocks of method 400 is changed, and/or some of the blocks are divided into separate blocks. For example, in one embodiment, the first set of parameters is caused to be transmitted to a user device after block 402 but before block 404, while the second set of parameters is caused to be transmitted to the user device after block 404.

Figure 8A:
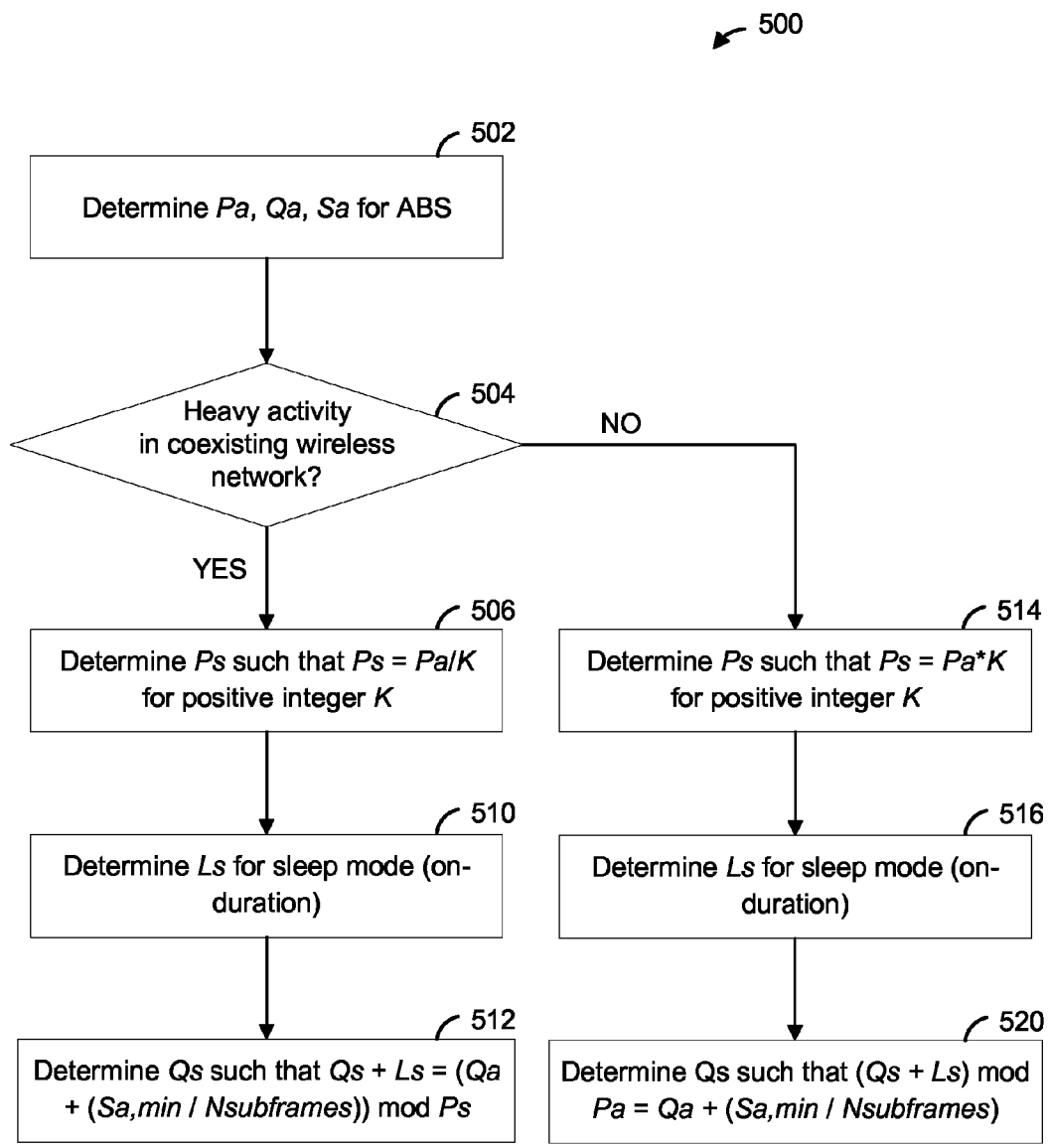
FIGS. 8A-8B are additional flow diagrams of example methods for synchronizing time intervals of two interference mitigation schemes, according to an embodiment.

FIG. 8A is a flow diagram of an example method 500 for synchronizing time intervals of two interference mitigation schemes. Specifically, the method 500 synchronizes an ABS interference mitigation scheme and a sleep mode interference mitigation scheme. A network controller, such as the base station 20, 26, or 30 of FIG. 1 or the eNB 114-1 or 114-2 of FIG. 2, is configured to implement the method 500, in an embodiment. In other embodiments, a network controller that is not a base station, but is connected to a base station via a wired backbone network, is configured to implement the method 500. In still other embodiments, a different wireless communication network device is configured to implement the method 500. In some embodiments, the method 500 is implemented by multiple wireless communication network devices, such as a base station and a separate network controller, or a base station and a user device.

At block 502, an ABS frame period Pa, an ABS frame offset Qa, and a set of ABS subframe locations Sa within a frame are determined. The parameters Pa, Qa, and Sa are similar to the parameters Pa, Qa, and Sa of FIGS. 3A and 3B, and/or to the first set of one or more parameters in block 402 of the method 400 in FIG. 7, in some embodiments. For example, the parameters Pa, Qa, and Sa are determined based on at least one of traffic demand and scheduling priority between two wireless communication networks, in an embodiment. Referring to FIG. 1 for one example, the parameters Pa, Qa, and Sa are determined based on at least one of traffic demand and scheduling priority between the macro cell network 10 and the pico cell network 12, in an embodiment. Referring to FIG. 2 for another example, the parameters Pa, Qa, and Sa are determined based on at least one of traffic demand and scheduling priority between a network including wireless communication link 150 and a network including wireless communication link 152, in an embodiment.

At block 504, it is determined whether a coexisting wireless network has, or is expected to have, heavy activity. In an embodiment, the coexisting wireless network is the network that the sleep mode interference mitigation scheme is designed to protect, by scheduling allowed data transmission time intervals in an interfering wireless communication network. Referring to FIG. 1 for one example, the coexisting wireless network is a wireless network (WiFi, Bluetooth, or GPS network) associated with the user device 22, where the interfering network is the macro cell network 10, in an embodiment. Referring to FIG. 2 for another example, the coexisting wireless network is a WiFi network including the UE 125-1 and the WiFi AP 140, where the interfering network is a network including the eNB 114-1 and the UE 125-1, in an embodiment.

In some embodiments, it is determined whether activity in the coexisting wireless network is heavy or light relative to a predetermined threshold. In some embodiments, an activity metric is measured and compared to a threshold to determine whether the activity is considered "heavy". In other embodiments, an indicator of expected or predicted activity is determined and compared to a threshold to determine whether the activity is considered "heavy".

If activity in the coexisting wireless network is determined to be heavy at block 504, flow proceeds to block 506. At block 506, an on-duration sleep mode time interval period Ps is determined such that Ps is equal to Pa/K for a positive integer K. In some embodiments, the value of K is determined by accessing a default value. For example, the value of K is always 1, is always 2, etc., in various embodiments. In other embodiments, the value of K is determined by selecting a positive integer based at least in part on a metric (e.g., determined at or prior to block 504) indicating the extent to which activity is heavy on the coexisting wireless network.

At block 510, an on-duration sleep mode time interval length Ls is determined. In some embodiments, the parameter Ls is determined based on at least one of traffic demand and scheduling priority between two wireless communication networks (e.g., the coexisting wireless network and interfering network discussed in connection with block 504). For example, in one embodiment, a relatively long Ls is determined where the interfering network has a low traffic demand and/or scheduling priority.

At block 512, an on-duration sleep mode time interval offset Qs is determined such that the quantity Qs+Ls is equal to (Qa+(Sa,min/Nsubframe)) mod Ps, where Sa,min is the minimum subframe number in the set Sa, and Nsubframe is the total number of subframes per frame.

If activity in the coexisting wireless network is determined to not be heavy at block 504, flow proceeds to block 514. At block 514, an on-duration sleep mode time interval period Ps is determined such that Ps is equal to Pa*K for a positive integer K. The value of K is determined in a manner similar to that described above in connection with block 506, in some embodiments.

At block 516, the on-duration sleep mode time interval length Ls is determined. The value of Ls is determined in a manner similar to that described above in connection with block 510, in some embodiments.

At block 520, the on-duration sleep mode time interval Qs is determined such that the quantity (Qs+Ls) mod Pa is equal to Qa+(Sa,min/Nsubframe).

In some embodiments, one or more blocks of method 500 are omitted, and/or additional blocks are added. For example, a block is added between blocks 504 and 506, and between blocks 504 and 514, in which the positive integer K is determined (e.g., based on how heavy traffic is within one or more wireless communication networks), in an embodiment. As another example, blocks 504, 514, 516, and 520 are omitted, and flow always proceeds from block 502 to block 506, in an embodiment. As another example, an additional block is added in which the determined parameters are caused to be transmitted to a user device and/or base station serving the user device, in an embodiment. Moreover, in some embodiments, the order of the blocks of method 500 is changed, and/or some of the blocks are divided into separate blocks. For example, block 510 occurs before block 506, and/or block 516 occurs before block 514, in some embodiments. In some embodiments, blocks 506, 510, and 512 correspond instead to the "NO" path of the method 500, and blocks 514, 516, and 520 correspond instead to the "YES" path of the method 500. Furthermore, while the method 500 of FIG. 8A shows particular parameters and equations for defining time intervals, other embodiments utilize other parameters and equations to indirectly satisfy the equations/constraints of the method 500. For example, the period Ps is replaced by an interval Ts that defines the time between the end of one time interval and the beginning of the next time interval, in an embodiment, and the equations of method 500 are modified accordingly (e.g., by replacing Ps with Ts+Ls). In some embodiments, the ABS time interval parameters are calculated based on on-duration (or off-duration) sleep mode time interval parameters or based on non-measurement gap (or measurement gap) time interval parameters, rather than vice versa.

In an embodiment, the method 500 is instead used to determine parameters for non-measurement gap time intervals. In this embodiment, the parameter Ps is replaced by the non-measurement gap time interval period Pg, the parameter Qs is replaced by the non-measurement gap time interval offset Qg, and the parameter Ls is replaced by the non-measurement gap time interval length Lg.

Figure 8B:
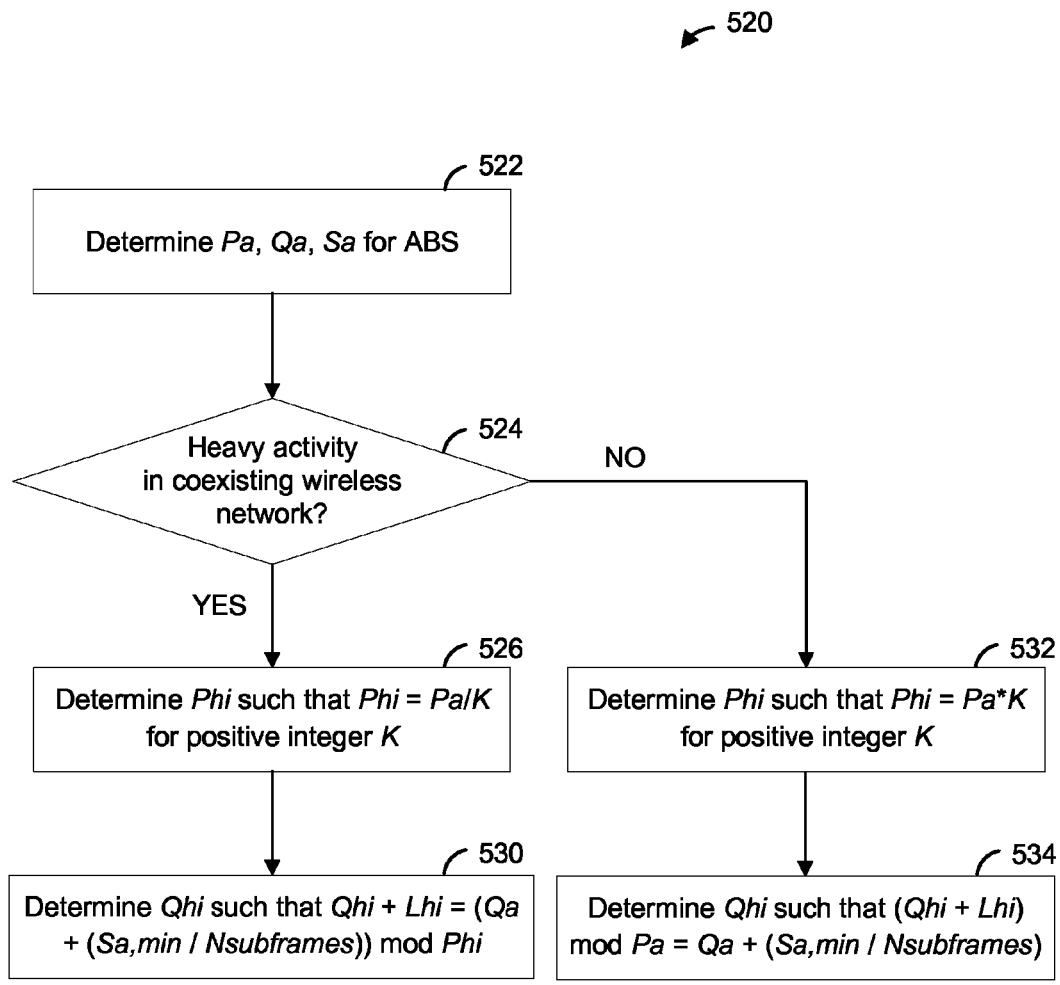

FIG. 8B is a flow diagram of an example method 520 for synchronizing time intervals of two interference mitigation schemes. Specifically, the method 520 synchronizes an ABS interference mitigation scheme and a HARQ process interference mitigation scheme. A network controller, such as the base station 20, 26, 30, or 36 of FIG. 1 or the eNB 114-1, 114-2, or 114-3 of FIG. 2, is configured to implement the method 520, in an embodiment. In other embodiments, a network controller that is not a base station, but is connected to a base station via a wired backbone network, is configured to implement the method 520. In still other embodiments, a different wireless communication network device is configured to implement the method 520. In some embodiments, the method 520 is implemented by multiple wireless communication network devices, such as a base station and a separate network controller, or a base station and a user device.

At block 522, an ABS frame period Pa, an ABS frame offset Qa, and a set of ABS subframe locations Sa within a frame are determined. The block 522 is similar to the block 502 of FIG. 8A, in some embodiments.

At block 524, it is determined whether a coexisting wireless network has, or is expected to have, heavy activity. In an embodiment, the coexisting wireless network is the network that the HARQ process interference mitigation scheme is designed to protect, by scheduling allowed data transmission and retransmission time intervals of an interfering wireless communication network. Referring to FIG. 1, for example, the coexisting wireless network is a wireless network (WiFi, Bluetooth, or GPS network) associated with the user device 22, where the interfering network is the macro cell network 10, in an embodiment. Referring to FIG. 2, as another example, the coexisting wireless network is a WiFi network including the UE 125-1 and the WiFi AP 140, where the interfering network is a network including the eNB 114-1 and the UE 125-1, in an embodiment.

In some embodiments, the manner in which it is determined whether activity in the coexisting wireless network is heavy or light relative to a predetermined threshold. In some embodiments, an activity metric is measured and compared to a threshold to determine whether the activity is considered "heavy". In other embodiments, an indicator of expected or predicted activity is determined and compared to a threshold to determine whether the activity is considered "heavy".

If activity in the coexisting wireless network is determined to be heavy at block 524, flow proceeds to block 526. At block 526, a used HARQ process period Phi is determined such that Phi is equal to Pa/K for a positive integer K. The value of K is determined in a manner similar to that described above in connection with block 506 of FIG. 8A, in some embodiments.

At block 530, a used HARQ process offset Qhi is determined such that the quantity Qhi+Lhi is equal to (Qa+(Sa,min/Nsubframe)) mod Phi, where Lhi is the length of the used HARQ process time interval, Sa,min is the minimum subframe number in the set Sa, and Nsubframe is the total number of subframes per frame. In an embodiment, Lhi is equal to 1/Nsubframe (e.g., 1 ms).

If activity in the coexisting wireless network is determined to not be heavy at block 524, flow proceeds to block 532. At block 532, the used HARQ process time interval period Phi is determined such that Phi is equal to Pa*K for a positive integer K. The value of K is determined in a manner similar to that described above in connection with block 506 of FIG. 8A, in some embodiments.

At block 534, the used HARQ process offset Qhi is determined such that the quantity (Qhi+Lhi) mod Pa is equal to Qa+(Sa,min/Nsubframe). In an embodiment, Lhi is equal to 1/Nsubframe (e.g., 1 ms).

In some embodiments, one or more blocks of method 520 are omitted, and/or additional blocks are added. For example, a block is added between blocks 524 and 526, and between blocks 524 and 532, in which the positive integer K is determined (e.g., based on how heavy traffic is within one or more wireless communication networks), in an embodiment. As another example, blocks 524, 532, and 534 are omitted, and flow always proceeds from block 522 to block 526, in an embodiment. As another example, an additional block is added in which the determined parameters are caused to be transmitted to a user device and/or base station serving the user device, in an embodiment. In some embodiments, blocks 526 and 530 correspond instead to the "NO" path of the method 520, and blocks 532 and 534 correspond instead to the "YES" path of the method 520. Moreover, while the method 520 of FIG. 8B shows particular parameters and equations for defining time intervals, other embodiments utilize other parameters and equations to indirectly satisfy the equations/constraints of the method 520. In some embodiments, the ABS time interval parameters are calculated based on used (or unused) HARQ process time interval parameters, rather than vice versa.

Figure 9A:
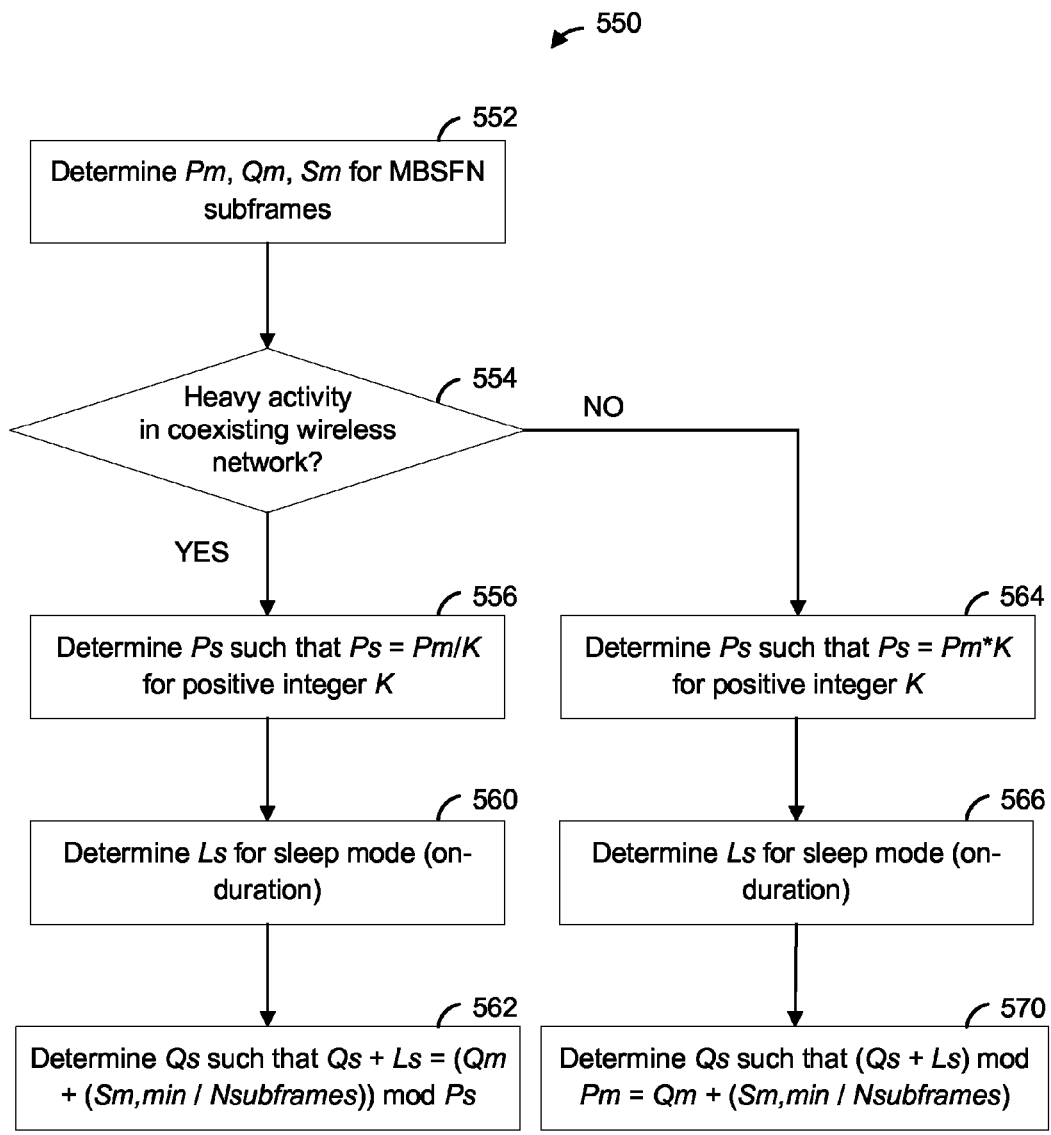
FIGS. 9A-9B are additional flow diagrams of example methods for synchronizing time intervals of two interference mitigation schemes, according to an embodiment.

FIG. 9A is a flow diagram of an example method 550 for synchronizing time intervals of two interference mitigation schemes. Specifically, the method 550 synchronizes an MBSFN interference mitigation scheme and a sleep mode interference mitigation scheme. A network controller, such as the base station 36 of FIG. 1 or the eNB 114-3 of FIG. 2, is configured to implement the method 550, in an embodiment. In other embodiments, a network controller that is not a base station, but is connected to a base station via a wired backbone network, is configured to implement the method 550. In still other embodiments, a different wireless communication network device is configured to implement the method 550. In some embodiments, the method 550 is implemented by multiple wireless communication network devices, such as a base station and a separate network controller, or a base station and a user device.

At block 552, an MBSFN frame period Pm, an MBSFN frame offset Qm, and a set of MBSFN subframe locations Sm within a frame are determined. The parameters Pm, Qm, and Sm are similar to the parameters Pm, Qm, and Sm of FIGS. 4A and 4B, and/or to the first set of one or more parameters in block 402 of the method 400 in FIG. 7, in some embodiments. For example, the parameters Pm, Qm, and Sm are determined based on at least one of traffic demand and scheduling priority between two wireless communication networks, in an embodiment. Referring to FIG. 1 for one example, the parameters Pm, Qm, and Sm are determined based on at least one of traffic demand and scheduling priority between the relay network 16 and the macro (donor) cell network 10, in an embodiment. Referring to FIG. 2 for another example, the parameters Pm, Qm, and Sm are determined based on at least one of traffic demand and scheduling priority between a network including wireless communication link 154 and a network including wireless communication link 156, in an embodiment.

At block 554, it is determined whether a coexisting wireless network has, or is expected to have, heavy activity. In an embodiment, the coexisting wireless network is the network that the sleep mode interference mitigation scheme is designed to protect, by scheduling allowed data transmission time intervals in an interfering wireless communication network. Referring to FIG. 1 for one example, the coexisting wireless network is a wireless network (WiFi, Bluetooth, or GPS network) associated with the user device 38, where the interfering network is the relay network 16, in an embodiment. Referring to FIG. 2 for another example, the coexisting wireless network is a WiFi, Bluetooth, or GPS network associated with UE 125-3, where the interfering network is a relay network including the relay eNB 114-3 and the UE 125-3, in an embodiment.

In some embodiments, it is determined whether activity in the coexisting wireless network is heavy or light relative to a predetermined threshold. In some embodiments, an activity metric is measured and compared to a threshold to determine whether the activity is considered "heavy". In other embodiments, an indicator of expected or predicted activity is determined and compared to a threshold to determine whether the activity is considered "heavy".

If activity in the coexisting wireless network is determined to be heavy at block 504, flow proceeds to block 556. At block 556, an on-duration sleep mode time interval period Ps is determined such that Ps is equal to Pm/K for a positive integer K. In some embodiments, the value of K is determined by accessing a default value. For example, the value of K is always 1, is always 2, etc., in various embodiments. In other embodiments, the value of K is determined by selecting a positive integer based at least in part on a metric (e.g., determined at or prior to block 554) indicating the extent to which activity is heavy on the coexisting wireless network.

At block 560, an on-duration sleep mode time interval length Ls is determined. In some embodiments, the parameter Ls is determined based on at least one of traffic demand and scheduling priority between two wireless communication networks (e.g., the coexisting wireless network and interfering relay network discussed in connection with block 554). For example, in one embodiment, a relatively long Ls is determined where the interfering network has a low traffic demand and/or scheduling priority.

At block 562, an on-duration sleep mode time interval offset Qs is determined such that the quantity Qs+Ls is equal to (Qm+(Sm, min/Nsubframe)) mod Ps, where Sm,min is the minimum subframe number in the set Sm, and Nsubframe is the total number of subframes per frame.

If activity in the coexisting wireless network is determined to not be heavy at block 554, flow proceeds to block 564. At block 564, an on-duration sleep mode time interval period Ps is determined such that Ps is equal to Pm*K for a positive integer K. The value of K is determined in a manner similar to that described above in connection with block 556, in some embodiments.

At block 566, the on-duration sleep mode time interval length Ls is determined. The value of Ls is determined in a manner similar to that described above in connection with block 560, in some embodiments.

At block 570, the on-duration sleep mode time interval Qs is determined such that the quantity (Qs+Ls) mod Pm is equal to Qm+(Sm,min/Nsubframe).

In some embodiments, one or more blocks of method 550 are omitted, and/or additional blocks are added. For example, a block is added between blocks 554 and 556, and between blocks 554 and 564, in which the positive integer K is determined (e.g., based on how heavy traffic is within one or more wireless communication networks), in an embodiment. As another example, blocks 554, 564, 566, and 570 are omitted, and flow always proceeds from block 552 to block 556, in an embodiment. As another example, an additional block is added in which the determined parameters are caused to be transmitted to a user device and/or base station serving the user device, in an embodiment. Moreover, in some embodiments, the order of the blocks of method 550 is changed, and/or some of the blocks are divided into separate blocks. For example, block 560 occurs before block 556, and/or block 566 occurs before block 564, in some embodiments. In some embodiments, blocks 556, 560, and 562 correspond instead to the "NO" path of the method 550, and blocks 564, 566, and 570 correspond instead to the "YES" path of the method 550. Furthermore, while the method 550 of FIG. 9A shows particular parameters and equations for defining time intervals, other embodiments utilize other parameters and equations to indirectly satisfy the equations/constraints of the method 550. For example, the period Ps is replaced by an interval Ts that defines the time between the end of one time interval and the beginning of the next time interval, in an embodiment, and the equations of method 550 are modified accordingly (e.g., by replacing Ps with Ts+Ls). In some embodiments, the MBSFN time interval parameters are calculated based on on-duration (or off-duration) sleep mode time interval parameters or based on non-measurement gap (or measurement gap) time interval parameters, rather than vice versa.

In an embodiment, the method 550 is instead used to determine parameters for non-measurement gap time intervals. In this embodiment, the parameter Ps is replaced by the non-measurement gap time interval period Pg, the parameter Qs is replaced by the non-measurement gap time interval offset Qg, and the parameter Ls is replaced by the non-measurement gap time interval length Lg.

Figure 9B:
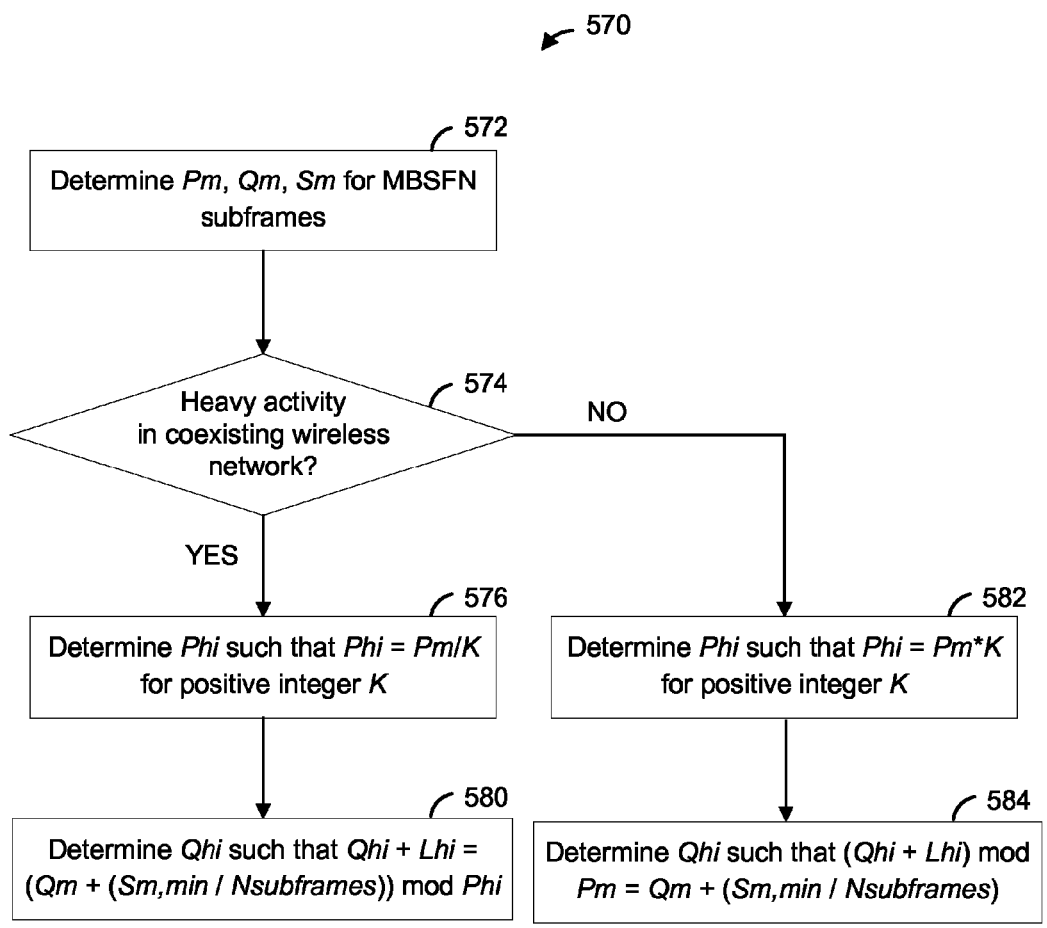

FIG. 9B is a flow diagram of an example method 570 for synchronizing time intervals of two interference mitigation schemes. Specifically, the method 570 synchronizes an MBSFN interference mitigation scheme and a HARQ process interference mitigation scheme. A network controller, such as the base station 20, 26, or 30 of FIG. 1 or the eNB 114-1 or 114-2 of FIG. 2, is configured to implement the method 570, in an embodiment. In other embodiments, a network controller that is not a base station, but is connected to a base station via a wired backbone network, is configured to implement the method 570. In still other embodiments, a different wireless communication network device is configured to implement the method 570. In some embodiments, the method 570 is implemented by multiple wireless communication network devices, such as a base station and a separate network controller, or a base station and a user device.

At block 572, an MBSFN frame period Pm, an MBSFN frame offset Qm, and a set of MBSFN subframe locations Sm within a frame are determined. The block 572 is similar to the block 552 of FIG. 9A, in some embodiments.

At block 574, it is determined whether a coexisting wireless network has, or is expected to have, heavy activity. In an embodiment, the coexisting wireless network is the network that the HARQ process interference mitigation scheme is designed to protect, by scheduling allowed data transmission and retransmission time intervals of an interfering wireless communication network. Referring to FIG. 1 as one example, the coexisting wireless network is a wireless network (WiFi, Bluetooth, or GPS network) associated with the user device 38, where the interfering network is the relay network 16, in an embodiment. Referring to FIG. 2 as another example, the coexisting wireless network is a WiFi, Bluetooth, or GPS network associated with UE 125-3, where the interfering network is a relay network including the relay eNB 114-3 and the UE 125-3, in an embodiment.

In some embodiments, the manner in which it is determined whether activity in the coexisting wireless network is heavy or light relative to a predetermined threshold. In some embodiments, an activity metric is measured and compared to a threshold to determine whether the activity is considered "heavy". In other embodiments, an indicator of expected or predicted activity is determined and compared to a threshold to determine whether the activity is considered "heavy".

If activity in the coexisting wireless network is determined to be heavy at block 574, flow proceeds to block 576. At block 576, a used HARQ process period Phi is determined such that Phi is equal to Pm/K for a positive integer K. The value of K is determined in a manner similar to that described above in connection with block 556 of FIG. 9A, in some embodiments.

At block 580, a used HARQ process offset Qhi is determined such that the quantity Qhi+Lhi is equal to (Qm+(Sm,min/Nsubframe)) mod Phi, where Lhi is the length of the used HARQ process time interval, Sm,min is the minimum subframe number in the set Sm, and Nsubframe is the total number of subframes per frame. In an embodiment, Lhi is equal to 1/Nsubframe (e.g., 1 ms).

If activity in the coexisting wireless network is determined to not be heavy at block 574, flow proceeds to block 582. At block 582, the used HARQ process time interval period Phi is determined such that Phi is equal to Pm*K for a positive integer K. The value of K is determined in a manner similar to that described above in connection with block 556 of FIG. 9A, in some embodiments.

At block 584, the used HARQ process offset Qhi is determined such that the quantity (Qhi+Lhi) mod Pm is equal to Qm+(Sm,min/Nsubframe). In an embodiment, Lhi is equal to 1/Nsubframe (e.g., 1 ms).

In some embodiments, one or more blocks of method 570 are omitted, and/or additional blocks are added. For example, a block is added between blocks 574 and 576, and between blocks 574 and 582, in which the positive integer K is determined (e.g., based on how heavy traffic is within one or more wireless communication networks), in an embodiment. As another example, blocks 574, 582, and 584 are omitted, and flow always proceeds from block 572 to block 576, in an embodiment. As another example, an additional block is added in which the determined parameters are caused to be transmitted to a user device and/or base station serving the user device, in an embodiment. In some embodiments, blocks 576 and 580 correspond instead to the "NO" path of the method 570, and blocks 582 and 584 correspond instead to the "YES" path of the method 570. Moreover, while the method 570 of FIG. 9B shows particular parameters and equations for defining time intervals, other embodiments utilize other parameters and equations to indirectly satisfy the equations/constraints of the method 570. In some embodiments, the MBSFN time interval parameters are calculated based on used (or unused) HARQ process time interval parameters, rather than not vice versa.

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method of synchronizing time domain multiplexing interference mitigation schemes of at least a first wireless communication link within a first network of a heterogeneous wireless network, a second wireless communication link within a second network of the heterogeneous wireless network, and a third wireless communication link within a third network, the method comprising:
    determining, by a network controller of the heterogeneous wireless network, a first set of one or more parameters defining a first set of time intervals, wherein
        the first set of time intervals restrict access to the first wireless communication link to reduce interference with the second wireless communication link;
    determining, by the network controller, a second set of one or more parameters defining a second set of time intervals based on the first set of time intervals, wherein
        the second set of time intervals restrict access to the first wireless communication link to reduce interference with the third wireless communication link; and
    causing, by the network controller, the first set of one or more parameters and the second set of one or more parameters to be transmitted to a first user device of the first wireless communication link and the third wireless communication link so that the first user device schedules i) data transmissions of the first wireless communication link to reduce interference with the second wireless communication link, and ii) data transmissions of the third wireless communication link to reduce interference with the first wireless communication link.

2. The method according to claim 1, wherein
the first wireless communication link is between a first base station and the first user device,
the first set of time intervals restricts downlink transmissions from the first base station to the first user device,
the second wireless communication link is between a second base station and a second user device, and
the second set of time intervals restricts downlink transmissions from the second base station to the second user device.

3. The method according to claim 2, wherein
the first set of time intervals restricts uplink transmissions from the first user device to the first base station, and
the second set of time intervals restricts uplink transmissions from the second user device to the second base station.

4. The method according to claim 2, wherein
the first set of time intervals restricts downlink data transmissions from the first base station to the first user device but does not restrict downlink control transmissions from the first base station to the first user device, and
the second set of time intervals restricts downlink data transmissions from the second base station to the second user device but does not restrict downlink control transmissions from the second base station to the second user device.

5. The method according to claim 2, wherein the first set of time intervals includes almost blank subframe (ABS) subframes.

6. The method according to claim 5, wherein the second set of time intervals includes unused hybrid automatic repeat request (HARQ) process subframes.

7. The method according to claim 5, wherein the first set of time intervals indicates to the first user device at least one time interval during which the first user device enters a reduced power state.

8. The method according to claim 1, wherein some or all of the first set of one or more parameters are of the same type as parameters of the second set of one or more parameters.

9. The method according to claim 8, wherein determining the second set of one or more parameters comprises calculating, by the network controller, at least one parameter of the second set of one or more parameters as a function of a value of the corresponding parameter having the same type of the first set of one or more parameters.

10. The method according to claim 8, wherein determining the second set of one or more parameters comprises calculating, by the network controller, at least one parameter of the second set of one or more parameters subject to one or more constraints relating to an amount of overlap between the first set of time intervals and the second set of time intervals.

11. The method according to claim 10, wherein the one or more constraints correspond to a maximum amount of overlap between the first set of time intervals and the second set of time intervals.

12. A wireless communication network device, comprising:
    a network controller of a heterogeneous cellular network configured to
        determine a first set of one or more parameters defining a first set of time intervals, wherein
            the first set of time intervals restrict access to a first wireless communication link within a first network of the heterogeneous cellular network to reduce interference with a second wireless communication link within a second network of the heterogeneous cellular network;
        determine a second set of one or more parameters defining a second set of time intervals based on the first set of time intervals, wherein
            the second set of time intervals restrict access to the first wireless communication link to reduce interference with a third wireless communication link within a third network; and
        cause the first set of one or more parameters and the second set of one or more parameters to be transmitted to a first user device of the first wireless communication link and the third wireless communication link so that the first user device schedules i) data transmissions of the first wireless communication link to reduce interference with the second wireless communication link, and ii) data transmissions of the third wireless communication link to reduce interference with the first wireless communication link.

13. The wireless communication network device according to claim 12, wherein
the first wireless communication link is between a first base station and the first user device,
the first set of time intervals restricts downlink transmissions from the first base station to the first user device,
the second wireless communication link is between a second base station and a second user device, and
the second set of time intervals restricts downlink transmissions from the second base station to the second user device.

14. The wireless communication network device according to claim 13, wherein
the first set of time intervals restricts uplink transmissions from the first user device to the first base station, and
the second set of time intervals restricts uplink transmissions from the second user device to the second base station.

15. The wireless communication network device according to claim 13, wherein
the first set of time intervals restricts downlink data transmissions from the first base station to the first user device but does not restrict downlink control transmissions from the first base station to the first user device, and
the second set of time intervals restricts downlink data transmissions from the second base station to the second user device but does not restrict downlink control transmissions from the second base station to the second user device.

16. The wireless communication network device according to claim 13, wherein the first set of time intervals includes almost blank subframe (ABS) subframes.

17. The wireless communication network device according to claim 16, wherein the second set of time intervals includes unused hybrid automatic repeat request (HARQ) process subframes.

18. The wireless communication network device according to claim 16, wherein the first set of time intervals indicates to the first user device to enter a reduced power state.

19. The wireless communication network device according to claim 12, wherein some or all of the first set of one or more parameters are of the same type as parameters of the second set of one or more parameters.

20. The wireless communication network device according to claim 19, wherein the network controller is configured to calculate at least one parameter of the second set of one or more parameters as a function of a value of the corresponding parameter having the same type of the first set of one or more parameters.

* * * * *